(12) United States Patent
Motomura

(10) Patent No.: US 7,253,420 B2
(45) Date of Patent: Aug. 7, 2007

(54) SCANNING MICROSCOPE SYSTEM

(75) Inventor: Shinji Motomura, Tokyo (JP)

(73) Assignee: Olympus Corporation, Tokyo (JP)

( * ) Notice: Subject to any disclaimer, the term of this patent is extended or adjusted under 35 U.S.C. 154(b) by 269 days.

(21) Appl. No.: 10/968,698

(22) Filed: Oct. 18, 2004

(65) Prior Publication Data

US 2005/0082494 A1 Apr. 21, 2005

(30) Foreign Application Priority Data

Oct. 21, 2003 (JP) .............................. 2003-360760

(51) Int. Cl.
*G21K 5/00* (2006.01)
(52) U.S. Cl. ................................................. 250/458.1
(58) Field of Classification Search ............... 250/458.1
See application file for complete search history.

(56) References Cited

U.S. PATENT DOCUMENTS 4,202,037 A * 5/1980 Glaser et al. ............... 345/632

4,647,531 A * 3/1987 Kamentsky ................. 435/7.24
2003/0086608 A1* 5/2003 Frost et al. .................. 382/173

FOREIGN PATENT DOCUMENTS

| JP | 2824462 B2 | 9/1998 |
|----|------------|--------|
| JP | 2003-005078 A | 1/2003 |

\* cited by examiner

*Primary Examiner*—David Porta
*Assistant Examiner*—Christopher Webb
(74) *Attorney, Agent, or Firm*—Frishauf, Holtz, Goodman & Chick, P.C.

(57) ABSTRACT

A scanning microscope system includes an optical microscope observation unit that irradiates the sample with excitation light, and forms an optical image from fluorescence emitted from a sample. The system also includes a scanning map creator and a flying spot scanning observation unit. The scanning map creator creates a scanning map indicating a scanning region in which a substance to be scanned exists in the sample, based on brightness of pixels of the optical image. The flying spot scanning observation unit scans the scanning region of the sample with laser beam, and forms a scanning image based on fluorescence emitted from the sample.

14 Claims, 19 Drawing Sheets

FIG.4C

SCANNING MAP  ⟨77

| | Y → | | | | | | | | | | |
|---|---|---|---|---|---|---|---|---|---|---|---|
| 1 | 1 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 |
| 0 | 1 | 1 | 0 | 0 | 0 | 0 | 0 | 0 | 0 | 1 | 1 |
| 0 | 0 | 0 | 0 | 0 | 1 | 1 | 0 | 0 | 0 | 1 | 1 |
| 0 | 0 | 0 | 0 | 0 | 0 | 1 | 0 | 0 | 0 | 0 | 0 |
| 0 | 0 | 1 | 1 | 0 | 0 | 0 | 0 | 1 | 1 | 0 | 0 |
| 0 | 0 | 1 | 1 | 0 | 0 | 0 | 0 | 1 | 1 | 0 | 0 |

X ↓

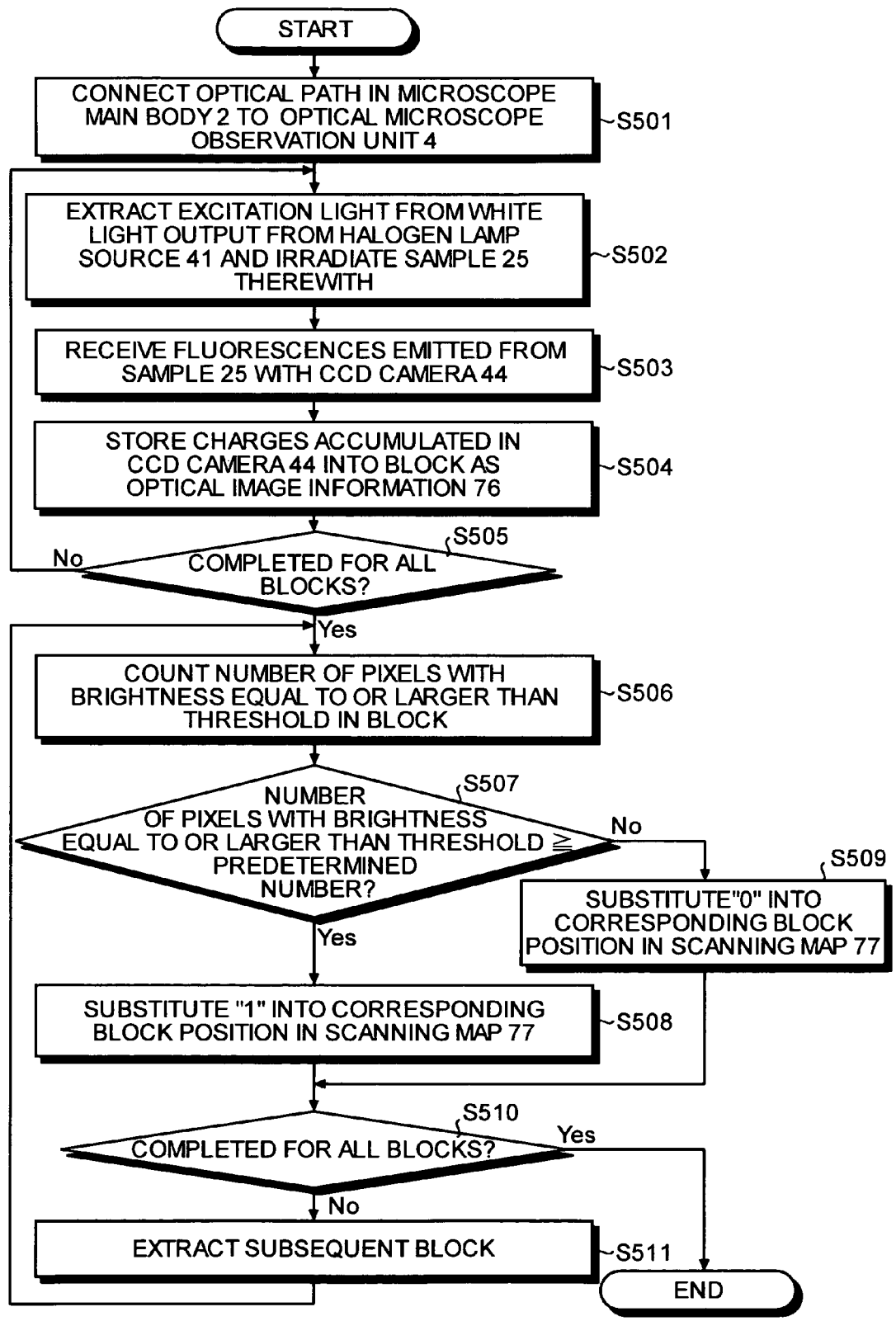

SCANNING MICROSCOPE SYSTEM

CROSS-REFERENCE TO RELATED APPLICATIONS

This application claims the benefit of priority of Japanese Patent Application No. 2003-360760 filed on Oct. 21, 2003, and the disclosure of which is incorporated herein by its entirely.

BACKGROUND OF THE INVENTION

1) Field of the Invention

The present invention relates to a scanning microscope system including a scanning microscope incorporated with an optical microscope, and, especially, to a scanning microscope system in which observations are made with a scanning microscope after a region to be observed with the scanning microscope is automatically selected with an optical microscope beforehand.

2) Description of the Related Art

An observation technique that carries out time series observation of neurons widely dispersed in a sample is used for analysis of neurons to date. Specifically, the neurons to be observed are extracted among hundreds of neurons dispersed in the sample, observations and experiments are performed as the time passes, and the analysis is performed, based on statistical data obtained through the observations and the experiments. Moreover, there is performed a multipoint time lapse system such that the regions in which the neurons are dispersed in the sample are observed in time series while the regions are moved with a motor-driven stage.

According to a scanning optical microscope disclosed in Japanese Patent No. 2824462, a sample multiple-stained with different fluorescent dyes is excited at different wavelengths, and a plurality of emitted fluoresces is detected with a photo detector. According to a disk-rotation confocal microscope is disclosed in Japanese Patent Application Laid-Open NO. 2003-5078, a disk provided with a transmission portion such as a slit pattern is inserted into an optical path in a common microscope, and rotation of the disk results in a confocal effect.

Since neurons are dispersed in a sample when the neurons are observed with a scanning microscope conventionally, it is required to take from a few days to about one week before positions of the neurons are specified, a laser beam source suitable for an observation object is selected, and images of the neurons are acquired. Moreover, since, in the scanning microscope, regions in which there are the neurons are screened by laser beam, the fluorescence intensity of some neurons decreases before they are observed. Such observation is carried out repeatedly for a long time. Accordingly, the main body of the microscope is heated by, for example, the laser beam source of the microscope, thereby being deflected. Since a motor-driven stage is also repeatedly moved during the repeated observation, errors by movements of the motor-driven stage are accumulated, and therefore shifts of observation positions are caused.

SUMMARY OF THE INVENTION

It is an object of the present invention to at least solve the problems in the conventional technology.

A scanning microscope system according to one aspect of the present invention includes an optical microscope observation unit that irradiates a sample with excitation light, and forms an optical image from fluorescence emitted from the sample. The system also includes a scanning map creator and a flying spot scanning observation unit. The scanning map creator creates a scanning map indicating a scanning region in which a substance to be scanned exists in the sample, based on brightness of pixels of the optical image. The flying spot scanning observation unit scans the scanning region of the sample with laser beam, and forms a scanning image based on fluorescence emitted from the sample.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4C is a view that depicts one example of a scanning map;

FIG. 5 is a flow chart that depicts processing procedure that creates the scanning map;

DETAILED DESCRIPTION

Exemplary embodiments of the present invention will now be explained in detail below with reference to the accompanying drawings. The invention is not limited to these embodiments, or to observation of biological specimens such as cells in a biological, or medical field, but can be also applied to other uses such as inspection of industrial products.

In a first embodiment, an image is acquired with an optical microscope, a region in which a pixel group forming the acquired image has great brightness is registered as a region in which there is a substance to be observed, and the registered region is observed with a scanning microscope.

Figure 1:
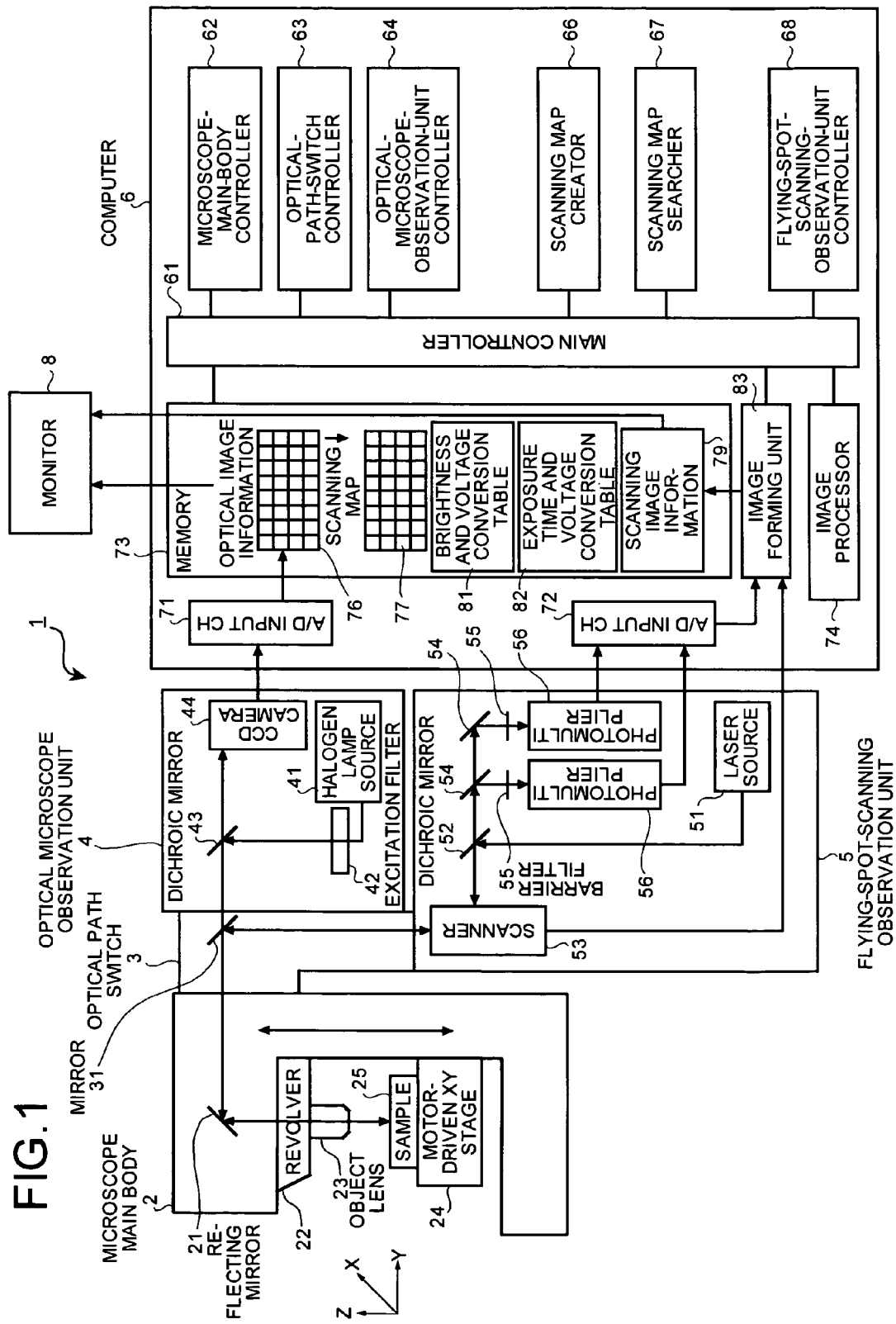
FIG. 1 is a block diagram that depicts a configuration of a scanning microscope system according to a first embodiment of the present invention.

FIG. 1 is a block diagram that depicts a configuration of a scanning microscope system according to the first embodiment. In the scanning microscope system 1, an optical path in a microscope main body 2 is connected to an optical microscope observation unit 4 and a flying spot scanning observation unit 5 through an optical path switch 3, and the microscope main body 2, the optical microscope observation unit 4, and the flying spot scanning observation unit 5 are connected to a computer 6 including a monitor 8 in order to control the system.

The computer 6 includes a main controller 61, a microscope-main-body controller 62 an optical-path-switch controller 63, an optical-microscope-observation unit controller 64, a scanning map creator 66, a scanning map searcher 67, a flying-spot-scanning-observation unit controller 68, an A/D (analog-digital) input channel (CH) 71 connected to the optical microscope observation unit 4, an A/D input CH 72 connected to the flying spot scanning observation unit 5, a memory 73, an image processor 74, and an image forming unit 83. The main controller 61 controls the microscope-main-body controller 62, the optical-path-switch controller 63, the optical-microscope-observation unit controller 64, the scanning map creator 66, the scanning map searcher 67, the flying-spot-scanning-observation unit controller 68, the image processor 74, and the image forming unit 83.

The microscope main body 2 includes a reflecting mirror 21, a revolver 22, an object lens 23, and an motor-driven XY stage 24, and is controlled by the microscope-main-body controller 62 in the computer 6. A sample 25 is mounted on the motor-driven XY stage 24.

Figure 2A:
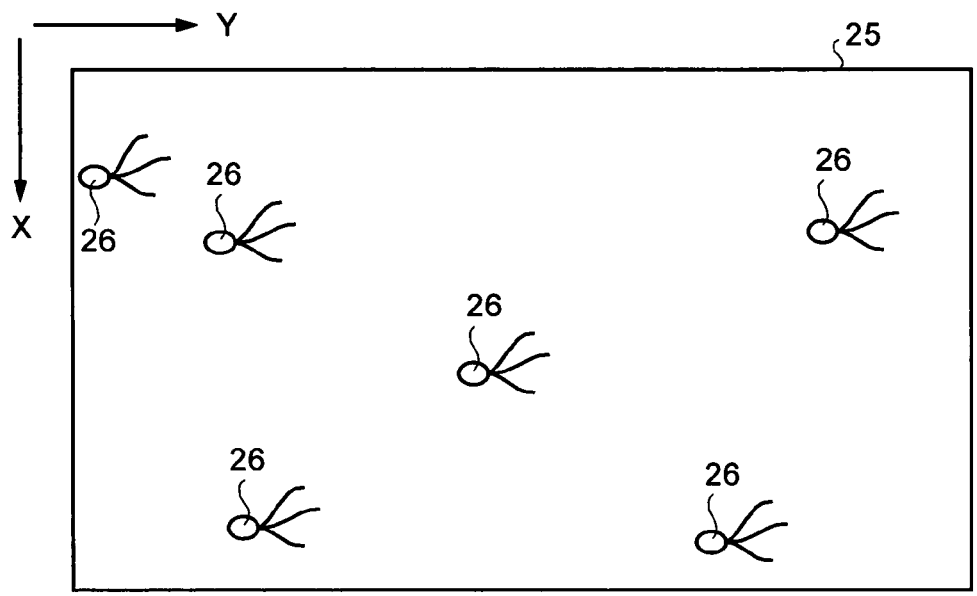
FIG. 2A is a top view of a sample on a motor-driven XY stage 24.
Figure 2B:
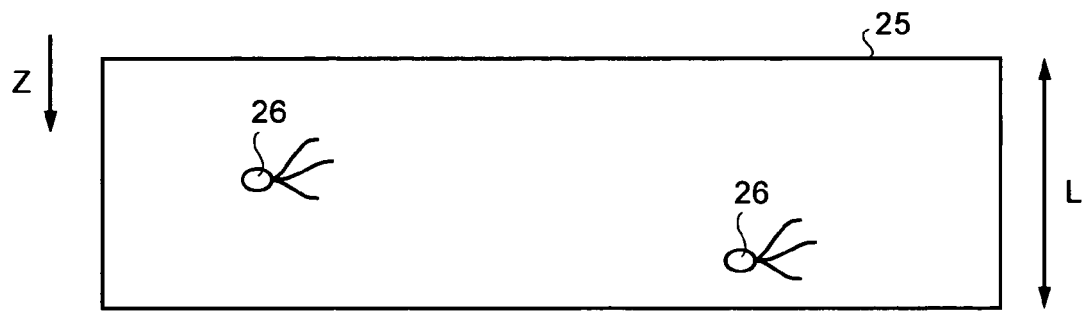
FIG. 2B is a side view of the sample.

FIG. 2A is a top view of the sample 25 on the motor-driven XY stage 24. FIG. 2B is a side view of the sample 25. The sample 25 has a thickness of L in the Z direction, and several hundreds of neurons 26 to be observed are scattered in the sample 25. The neurons 26 have been stained with fluorescent dyes beforehand according to observation objects.

When an image of the sample 25 is acquired with the optical microscope observation unit 4, it is difficult to acquire only a sharp image at the focus position, and the image acquired with the optical microscope observation unit 4 includes component images, which are out of focus, at positions other than the focus position, because a focus depth is corresponding to the magnification (numerical aperture) of the object lens 23.

The sample 25 mounted on the motor-driven XY stage 24 is irradiated with excitation light entered from the optical microscope observation unit 4, or the flying spot scanning observation unit 5 through the reflecting mirror 21, and the object lens 23 installed in the revolver 22. When the light is applied to the sample 25, the neuron 26 in the sample 25 to be observed emits fluorescence.

The fluorescence emitted from the sample 25 is guided to the optical microscope observation unit 4 or the flying spot scanning observation unit 5 in the backward direction along the optical path, along which the light has entered, that is, through the object lens 23, the reflecting mirror 21, and the optical path switch 3. The optical path switch 3 includes a mirror 31 that can be inserted into the optical path, and the optical-path-switch controller 63 in the computer 6 controls the insertion of the mirror 31. When the mirror 31 is inserted onto the optical path in the optical path switch 3, the optical path in the microscope main body 2 is connected to the flying spot scanning observation unit 5. When the mirror 31 is removed from the path, the optical path in the microscope main body 2 is connected to the optical microscope observation unit 4.

The microscope-main-body controller 62 electrically controls a focusing unit such as the revolver 22 and the motor-driven XY stage 24 in the microscope main body 2 in order to adjust the focus position. For example, the object lens 23 installed in the revolver 22 is moved in the Z direction for focusing in the Z direction, and the motor-driven XY stage 24 is done in the X and Y directions to acquire an image within a range specified by an observer. When the image is acquired with a CCD camera 44 in the optical microscope observation unit 4, and with the flying spot scanning observation unit 5, an image with approximately the same size is acquired with the object lens 23 with the same magnification.

The optical microscope observation unit 4 includes a halogen lamp source 41, a excitation filter 42, a dichroic mirror 43, and a CCD camera 44, and is controlled by the optical-microscope-observation unit controller 64 in the computer 6. The halogen lamp source 41 is a white light source. The light source of the optical-microscope-observation unit controller 64 is not limited to a halogen lamp, and may use a white light source such as a xenon lamp. The excitation filter 42 extracts light with a wavelength exciting fluorescence, with which the sample 25 is stained, from white light emitted from the halogen lamp source 41. The light extracted with the excitation filter 42 enters the optical path switch 3 through the dichroic mirror 43.

The CCD camera 44 receives the fluorescence and the reflection light emitted from the sample 25, which are passing through the dichroic mirror 43. The CCD camera 44 is a photoelectric converter that accumulates charges according to the amount of the light emitted from the sample 25.

Figure 3:
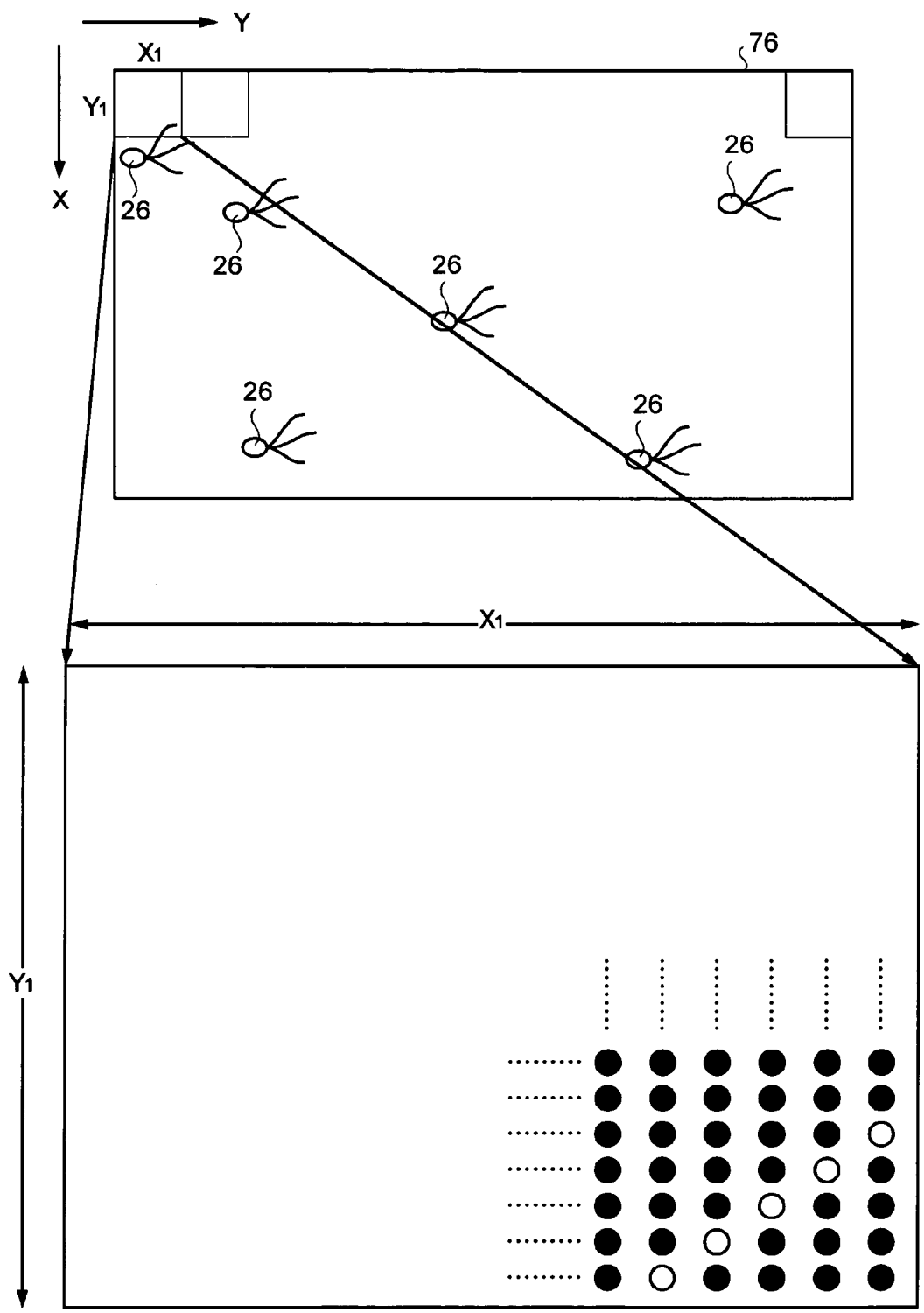
FIG. 3 is an exemplary view that depicts optical image information, and one enlarged block forming the optical image information.

The A/D input CH 71 converts the charges accumulated in the CCD camera 44 into a digital electric signal, and each block of optical image information 76 in the memory 73 sequentially stores the charges. FIG. 3 is an exemplary view that depicts the optical image information 76, and one enlarged block forming the optical image information 76. One block of the optical image information 76 stores the image formed with the CCD camera 44. When images of the sample 25 are formed one by one from one end to the other while controlling the motor-driven XY stage 24, the extensive optical image information 76 as shown in FIG. 3 can be acquired.

The size of each block of the optical image information 76 is an image size of $X_1Y_1$, which is acquired by the optical microscope observation unit 4 or the flying spot scanning observation unit 5. In the enlarged view of a block as shown in FIG. 3, pixels with high brightness are represented by open circle marks, and those with low one are done by solid circle marks. Portions with neurons 26 are schematically denoted by the open circle marks, because the brightness is high in the portions with the neurons. On the other hand, portions with no neurons 26 are denoted by the solid circle marks in a schematic manner, because the brightness is low in the portions with no neurons.

The memory 73 stores the optical image information 76, a scanning map 77 created from the optical image information 76, scanning image information 79, a brightness and voltage conversion table 81, and an exposure time and voltage conversion table 82.

The image processor 74 constructs an image for display on the monitor 8, using the optical image information 76, or the scanning image information 79 in the memory 73, which are acquired through the main controller 61. The optical image information 76 includes image data for each block, which is acquired from the optical microscope observation unit 4 through the A/D input CH 71, and integration of pieces of the image data for each block, and the scanning image information 79 is image data formed by the image forming unit 83, based on (1) output signals output from photomultipliers 56 in the flying spot scanning observation unit 5 through the A/D input CH 72, and (2) the scanning position information from the scanner 53.

The brightness and voltage conversion table 81 sets the voltage of the photomultipliers 56 in the flying spot scanning observation unit 5, using the optical image information 76 acquired with the optical microscope observation unit 4. The exposure time and voltage conversion table 82 is used for setting the voltage of the photomultipliers 56 in the flying spot scanning observation unit 5, using exposure time of the CCD camera 44 when an image is acquired, using the automatic exposure control function of the CCD camera 44.

The scanning map creator 66 counts, through the main controller 61, the number of pixels with brightness higher than a threshold, for example, the number of pixels represented by open circle marks among pixels in blocks in the optical image information 76 in the memory 73. If the number of pixels with brightness higher than a threshold is equal to or larger than a predetermined number in a block, the block is set as a block with neurons 26. That is, the scanning map creator 66 screens blocks with the neurons 26 to create the scanning map 77 that memorizes information on positions of the blocks.

Figure 4A:
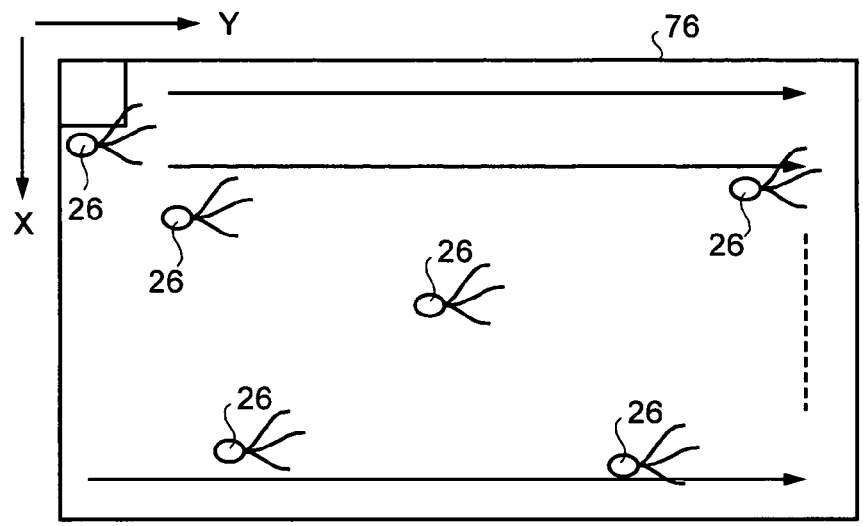
FIG. 4A is a view that depicts a step at which images of blocks in the optical image information are acquired one by one, and blocks in which a neuron exists are screened.
Figure 4B:
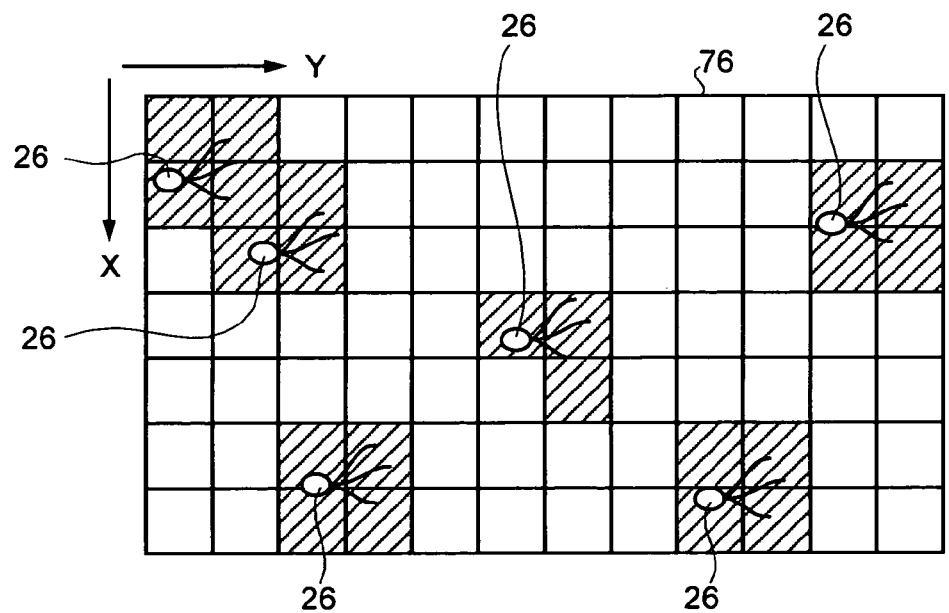
FIG. 4B is a view that depicts diagonally shaded blocks having the neuron to be observed.

FIG. 4A is a view that depicts a step of screening by the scanning map creator 66. FIG. 4B is a view that depicts diagonally shaded blocks having the neurons 26 to be observed. FIG. 4C is a view that depicts one example of the scanning map 77.

The scanning map creator 66 screens blocks as shown in FIG. 4A, using the CCD camera 44 in the optical microscope observation unit 4, to acquire the optical image information 76 for each block from the right to the left one by one in the X direction of the optical image information 76 and to determine whether the number of pixels with brightness equal to or higher than the threshold is equal to or larger than the predetermined number in the block with the acquired optical image information 76. When the process is completed for one horizontal row in the Y direction, the process proceeds to that of the subsequent row, which is just under the previous row by one in the Y direction, to repeat the similar screening. The scanning map creator 66 writes "1" into the positions of diagonally shaded blocks, in which the number of pixels with brightness equal to or higher than the threshold is equal to or larger than the predetermined number and it can be assumed as shown, for example, in FIG. 4B that there are the neurons 26 to be observed, and "0" into those of blocks in which the number of pixels with brightness equal to or higher than the threshold is smaller than the predetermined number. The scanning map 77 shown in FIG. 4C is created as described above.

Thus, the blocks in which "1" is written in the scanning map 77 are registered in such a way that further detailed images are acquired with the flying spot scanning observation unit 5. Moreover, when it is confirmed that the brightness at the edge of a block is equal to or higher than the threshold, "1" is also substituted into the position of another block next to the block in the scanning map 77, based on link information for the pixels, and the another block is registered in such a way that the another block acquires an image with the flying spot scanning observation unit 5, because there are some cases in which one block that can be acquired in the flying spot scanning observation unit 5 is too small to put the whole axon of a neuron 26 therein.

Under control of the optical-path-switch controller 63, the mirror 31 is inserted into the optical path of the optical path switch 3, and the optical path in the microscope main body 2 is connected to the flying spot scanning observation unit 5. Thereafter, the scanning map searcher 67 automatically searches for blocks in which "1" is written in the scanning map 77, and acquires detailed images of the blocks, in which "1" is written, through the flying spot scanning observation unit 5.

The flying spot scanning observation unit 5 includes a laser beam source 51, a dichroic mirror 52 for switching excitation wavelengths, a scanner 53, a plurality of dichroic mirrors 54 that perform measurement, and a plurality of sets of barrier filters 55 and photomultipliers 56 which are connected to the dichroic mirror 54 one by one. Moreover, the flying-spot-scanning-observation unit controller 68 in the computer 6 controls the unit 5.

The flying-spot-scanning-observation unit controller 68 controls the laser beam source 51 so that the source 51 emits laser beam with the same wavelength as that of the excitation filter 42 in the optical microscope observation unit 4.

The dichroic mirror 52 reflects laser beam from the laser beam source 51 so that the light enters the scanner 53. The scanner 53 includes two not-shown galvanometer mirrors that perform X-direction scanning and Y-direction scanning. The scanner 53 scans a sample in the X and Y directions with light from the laser beam source 51 according to scanning control signals from the computer 6, and outputs end-of-scanning signals to the computer 6 whenever scanning one line in the X direction.

The scanner 53 is provided so that the light that scans a sample in the X and Y directions is applied to the sample 25 in the microscope main body 2 as spot light through the optical path switch 3. Fluorescence or reflection light emitted from the sample 25, based on irradiation of spot light, is returned to the flying spot scanning observation unit 5 through the optical path switch 3.

The light returned to the flying spot scanning observation unit 5 passes through the dichroic mirror 52, and the photoelectric converters such as the photomultipliers 56 receive only light with wavelengths limited with a measurement-wavelength switch such as the dichroic mirror 54, which perform measurement, and the barrier filters 55 as observers desire.

The photoelectric converter such as the photomultipliers 56 accumulates charges according to the amount of the light, the A/D input CH 72 converts the charges to a digital electric signal, the image forming unit 83 forms a two-dimensional image, based on the output signals from the photomultipliers 56 and the scanning position information from the scanner 53, and the two-dimensional image is stored in the memory 73 as the scanning image information 79. The image processor 74, as required, constructs an image, based on the scanning image information 79 through the main controller 61, for display on the monitor 8.

Processing of creating the scanning map 77 will be explained below. FIG. 5 is a flow chart that depicts processing that creates the scanning map 77. For example, at start of observation of the neurons 26 the main controller 61 activates the processing creating the scanning map 77, using commands and the like that observers input. When the processing that creates the scanning map 77 is started, in the first place, the optical-path-switch controller 63 removes the mirror 31 in the optical path switch 3, and the optical path in the microscope main body 2 is connected to the optical microscope observation unit 4 (step S501).

Under control of the optical-microscope-observation unit controller 64, excitation light is extracted with the excitation filter 42 from the white light emitted from the halogen lamp source 41 in the optical microscope observation unit 4, and the light enters the microscope main body 2 from the optical path switch 3 through the dichroic mirror 43. The microscope-main-body controller 62 controls the excitation light that enters the microscope main body 2 so that the light irradiates the sample 25 mounted on the motor-driven XY stage 24 through the reflecting mirror 21 in the microscope main body 2, and the object lens 23 installed in the revolver 22 (step S502).

When the sample 25 is irradiated with the excitation light, the neurons 26 to be observed in the sample 25 emit fluorescence. The CCD camera 44 receives the light which the sample 25 emits and passes through the dichroic mirror 43 (step S503). The A/D input CH 71 converts the charges, which the CCD camera 44 accumulates according to the amount of the light, into a digital electric signal, and one block in the optical image information 76 stores the signal (step S504). When the processing is not completed for all blocks (NO at step S505), the processing returns to step S502 to acquire the image of the subsequent block in the optical image information 76.

When the processing of image acquisition is completed for all blocks (YES at step S505), the scanning map creator 66 counts the number of pixels with brightness equal to or higher than the threshold among pixels in the image in a block (step S506). When the number of pixels with brightness equal to or higher than the threshold in the block is equal to or larger than the predetermined number after the counting (YES at step S507), "1" is substituted into the position of the corresponding block in the scanning map 77, and the corresponding block is registered in such a way that the flying spot scanning observation unit 5 observes there (step S508). When the number of pixels with brightness equal to or higher than the threshold is smaller than the predetermined number (NO at step S507), "0" is substituted into the position of the corresponding block in the scanning map 77 (step S509).

When the neurons 26 are substances to be observed and the brightness is confirmed at the edge of a block, "1" may be also substituted into the position of another block next to the corresponding block in the scanning map 77, based on link information for the pixels, in such a way that the flying spot scanning observation unit 5 observes there and the above blocks may be registered in such a way that the flying spot scanning observation unit 5 observes there.

When the processing is not completed for all blocks (NO at step S510), the subsequent block is extracted (step S511), and the processing returns to step S506 to repeat the similar processing for the subsequent block. When the processing is completed for all blocks (YES at step S510), the processing of creating the scanning map 77 is completed.

Figure 6:
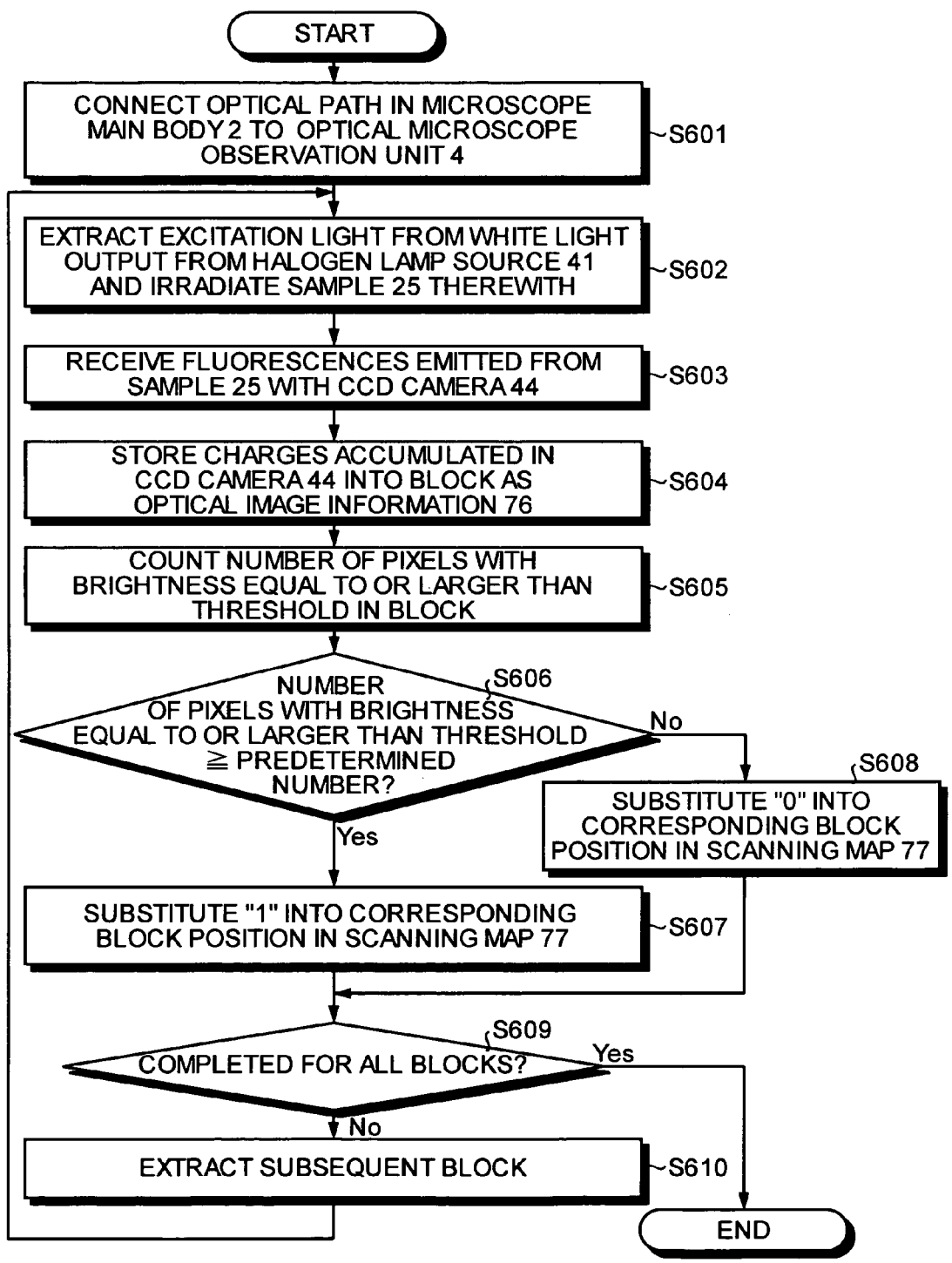
FIG. 6 is a flow chart that depicts another processing procedure of creating the scanning map.

FIG. 6 is a flow chart that depicts variation processing of creating the scanning map 77. Processing from step S601 to step S604 is the same as the processing from step S501 to step S504 through which the image of one block in the optical image information 76 is acquired, and processing from step S605 to step S610 is the same as the processing from step S506 to step S511 through which it is determined whether the scanning map 77 registers one block, which acquired the image, in the optical image information 76. The second processing of creating the scanning map 77 determines whether blocks which continuously acquired images after acquiring the image of one block of the optical image information 76 are registered in the scanning map 77. The scanning map 77 may be created through processing according to either of FIG. 5 or FIG. 6.

When the flying spot scanning observation unit 5 observes the neurons 26 in time series, processing of searching the scanning map 77 is started at intervals over time set with a timer and the like at completion of creating the scanning map 77.

Figure 7:
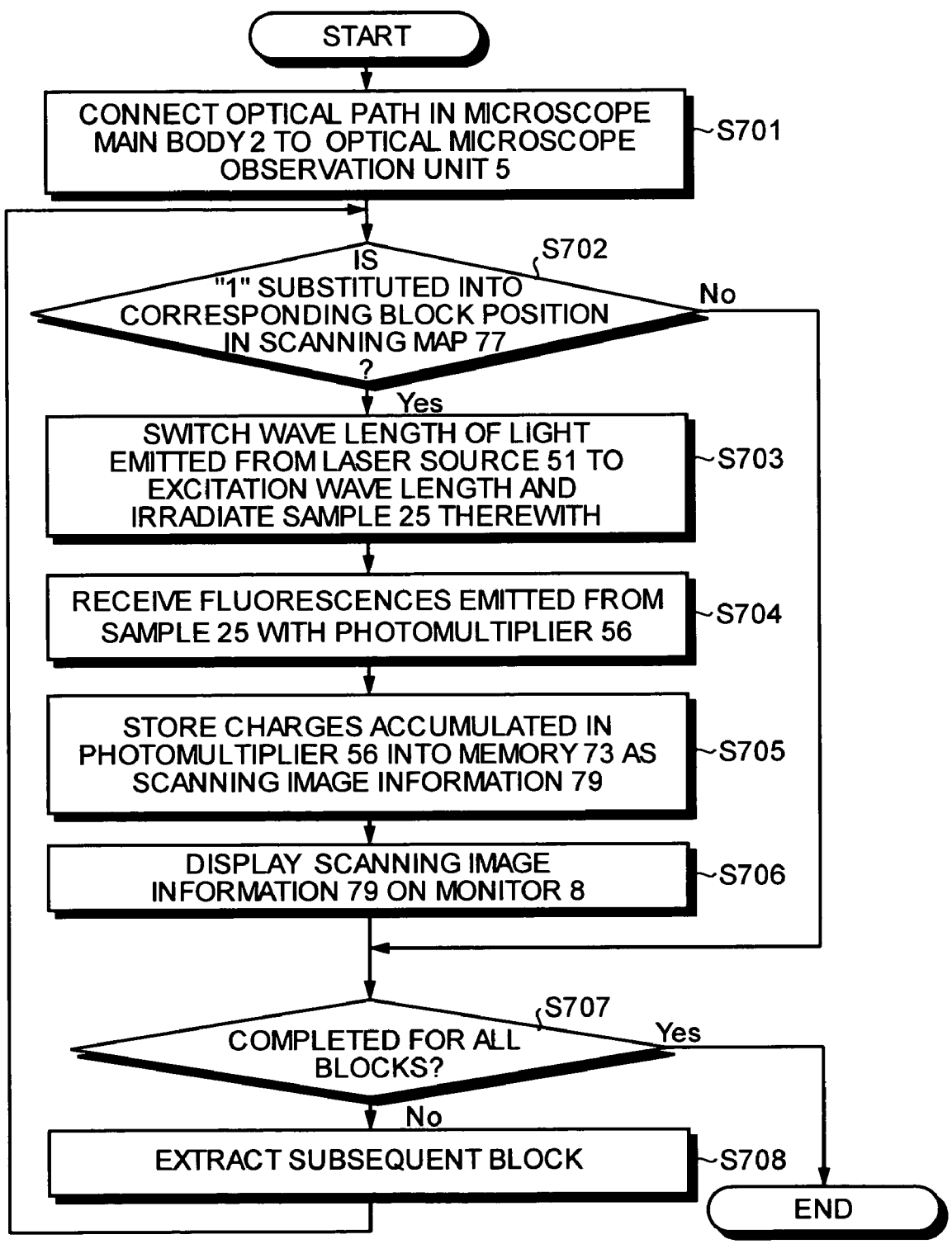
FIG. 7 is a flow chart that depicts processing procedure of searching the scanning map.

Subsequently, processing of searching the scanning map 77 is explained. FIG. 7 is a flow chart that depicts processing of searching the scanning map 77. For example, when the neurons 26 are observed in time series, the main controller 61 starts processing of searching the scanning map 77 at intervals over time set with a timer and the like. In the first place, under control of the optical-path-switch controller 63, the mirror 31 in the optical path switch 3 is inserted, and the optical path in the microscope main body 2 is connected to the flying spot scanning observation unit 5 (step S701).

Then, the scanning map 77 searcher 67 sequentially searches the scanning map 77. If "1" is substituted into the position of the corresponding block in the scanning map 77 (YES at step S702), laser beam with the same wavelength as the excitation wavelength, which is emitted from the laser beam source 51 in the flying spot scanning observation unit 5 with the scanning optical-microscope-observation unit controller 64 and extracted with the excitation filter 42 in the optical microscope observation unit 4, irradiates the sample 25 on the microscope main body 2 as spot light through the optical path switch 3 under scanning in the X and Y directions with the scanner 53 (step S703).

The fluorescence or the reflection light emitted from the sample 25 that is irradiation with the spot light returns to the flying spot scanning observation unit 5 through the optical path switch 3. The light returned to the flying spot scanning observation unit 5 passes through the dichroic mirror 52, and the photoelectric converter such as the photomultipliers 56 receives the light with wavelengths limited with a measurement-wavelength switch such as the dichroic mirror 54, which perform measurement, and the barrier filters 55 as observers desire (step S704).

The A/D input CH 72 converts the charges, which the photomultipliers 56 accumulates according to the amount of the light, into a digital electric signal, the image forming unit 83 forms a two-dimensional image, based on the output signal from the photomultipliers 56 and the scanning position information from the scanner 53, and the memory 73 stores the image as the scanning image information 79 (step S705).

The image processor 74 constructs an image with the scanning image information 79 through the main controller 61, and displays the image on the monitor 8 (step S706). If the processing is not completed for all blocks (NO at step S707), the subsequent block in the scanning map 77 is selected (step S708), and the processing returns to step S702 to repeat the similar processing. If the processing is completed for all blocks (YES at step S707), processing of searching the scanning map 77 is completed, and is started again at intervals over time set with a timer and the like.

The first embodiment has a configuration in which, as shown at step S504 and step S604, one block in the optical image information 76 stores charges which the CCD camera 44 accumulates according to the amount of the light, but the size of the image formed with the CCD camera 44 is not limited to one block in the optical image information 76. A configuration in which an image for a plurality of blocks, for example, about three or four blocks is formed, the image is stored as an integrated one in the optical image information 76, and each block is screened may be applied.

As explained above in detail, since the first embodiment has a configuration in which, among blocks in the optical image information 76 acquired with the optical microscope observation unit 4, blocks in which the number of pixels with brightness equal to or higher than the threshold is equal to or larger than the predetermined number are registered, and the scanning image information 79 for the blocks registered in the scanning map 77 is automatically acquired, using a timer and the like, it is possible to automatically observe neurons 26, which agree to an observation object, in detail with the flying spot scanning observation unit 5, it is possible to automatically observe neurons 26, which agree to an observation object, in detail with the flying spot scanning observation unit 5, though there are several hundreds of neurons 26 scattered on a sample to be observed. Accordingly, the load of observers can be reduced to shorten time required to observe. Moreover, as white light such as halogen light is used at screening with the optical microscope observation unit 4, less fading in fluorescence can be caused by screening, and sharp scanning image information 79 can be obtained.

Optical image information 76 is acquired beforehand, using the CCD camera 44 in the optical microscope observation unit 4, in the first embodiment. Thereafter, the optical image information 76 acquired with the optical microscope observation unit 4 can be used when conditions are set in order to acquire the scanning image information 79, using the flying spot scanning observation unit 5.

Figure 8A:
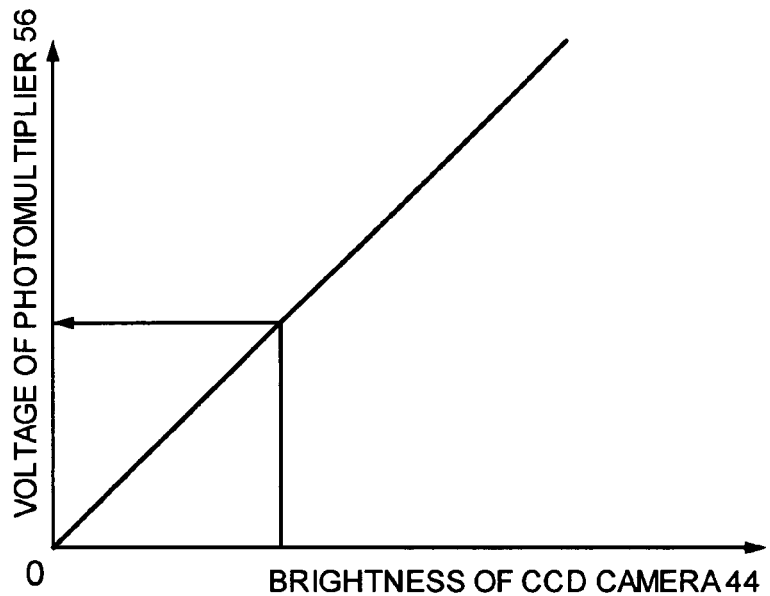
FIG. 8A is a view that depicts an example of a brightness and voltage conversion table.

That is, if the voltage of the photoelectric converters such as the photomultipliers 56 in the flying spot scanning observation unit 5 is set, based on the optical image information 76 acquired beforehand with the optical microscope observation unit 4, or conditions by which images are formed, the best voltage of the photomultipliers 56 can be set. FIG. 8A is a view that depicts an example of the brightness and voltage conversion table 81. When the voltage of the photomultipliers 56 as the vertical axis is obtained from the brightness of the optical image information 76 acquired with the optical microscope observation unit 4 as the horizontal axis, using the brightness and voltage conversion table 81, the best voltage to drive the photomultipliers 56 can be automatically set when an image is acquired in the flying spot scanning observation unit 5. At this time, in order to use the same conditions under which an image for the optical image information 76 is acquired, the optical image information 76 is acquired, assuming that the charge accumulation time of the CCD camera 44 is constant.

Figure 8B:
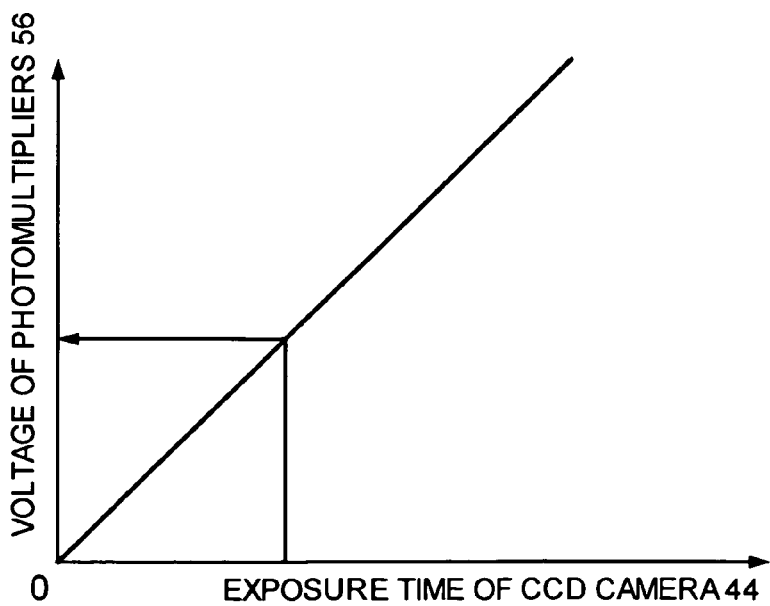
FIG. 8B is a view that depicts an example of an exposure time and voltage conversion table.

Similarly, the voltage of the photomultipliers 56 in the flying spot scanning observation unit 5 is set, using automatic setting function, which the CCD camera 44 has, to determine exposure time of each block. FIG. 8B is a view that depicts an example of the exposure time and voltage conversion table 82. When the voltage of the photomultipliers 56 as the vertical axis is obtained from the exposure time of the CCD camera 44 as the horizontal axis, using the exposure time and voltage conversion table 82, the best voltage to drive the photomultipliers 56 can be automatically set when an image is acquired in the flying spot scanning observation unit 5. A memory memorizes the voltage of the photomultipliers 56 obtained as described above together with position information for each block.

When the number of pixels with brightness equal to or higher than the threshold in a block in the optical image information 76 acquired in the optical microscope observation unit 4 is equal to or smaller than the predetermined small number, sharp scanning image information 79 with less noise can be obtained, if, for example, the gain and the offset of the A/D input CH 72 are adjusted in such a way that the information in the corresponding block is removed as noise. The predetermined small number means a number smaller than a predetermined number by which it is judged at step S507 that neurons 26 to be observed exists.

A second embodiment has a configuration in which a disk in which a plurality of pinholes or a plurality of slits are formed is inserted into a confocal position on an optical path in an optical microscope observation unit 4, a plurality of confocal images are acquired while moving a focus in the Z direction by rotating the disk, a plurality of acquired confocal images are laminated in the Z direction to form a three-dimensional image, regions in which substances to be observed exist are screened, based on the three-dimensional image, and regions to be inspected with a flying spot scanning observation unit 5 are specified.

Figure 9:
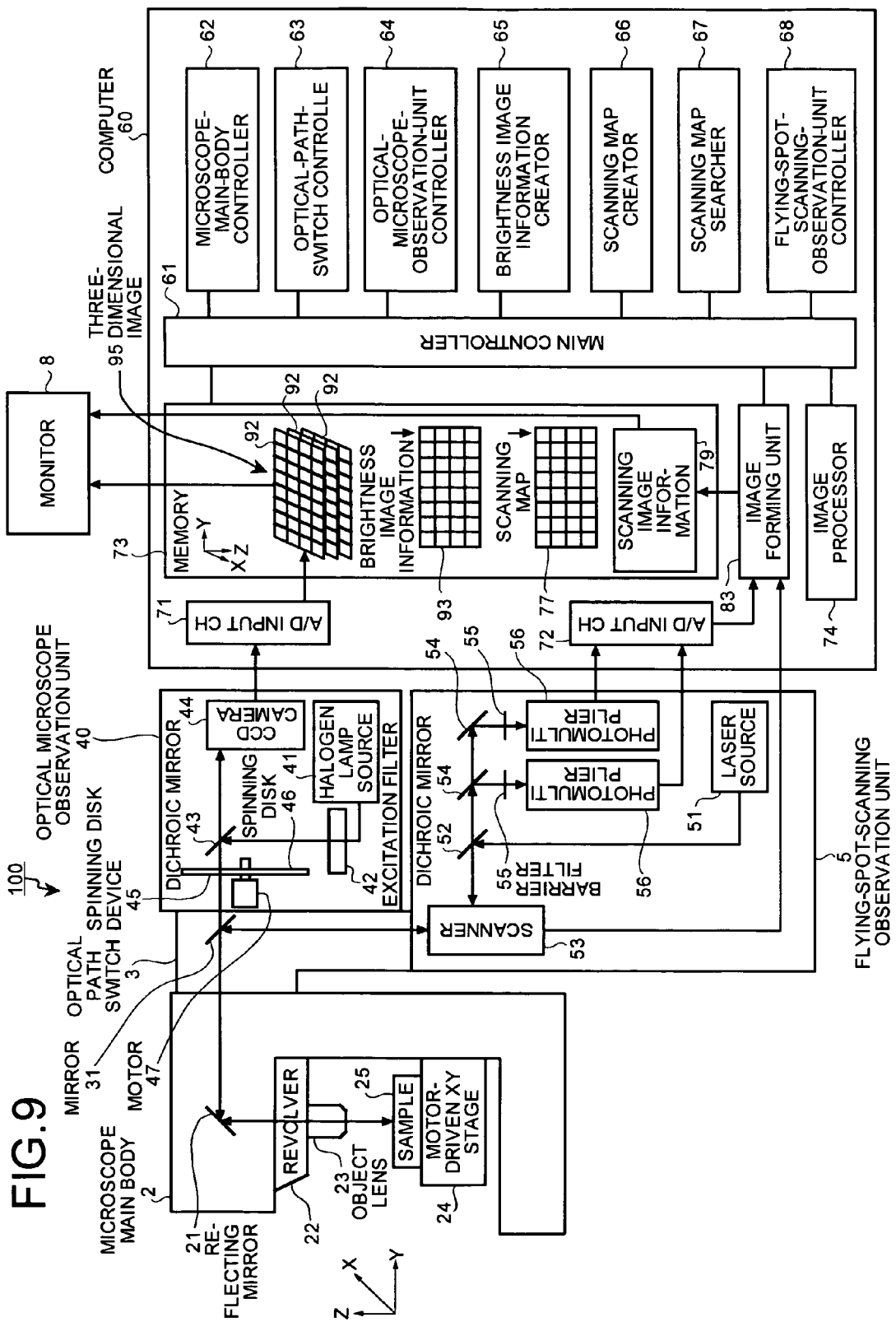
FIG. 9 is a block diagram that depicts a configuration of a scanning microscope system according to a second embodiment of the present invention.

FIG. 9 is a block diagram that depicts a configuration of a scanning microscope system 100 according to the second embodiment of the present invention. In the scanning microscope system 100 shown in FIG. 9, components similar to those in the scanning microscope system 1 according to the first embodiment shown in FIG. 1 are denoted by the same reference numbers as those in FIG. 1.

In FIG. 9, in an optical microscope observation unit 40, a spinning disk device 45 is arranged at a confocal position of an optical path in an optical microscope observation unit 4 according to the first embodiment. The spinning disk device 45 includes a spinning disk 46 in which a light-transmitting portion and a light-proof portion are alternately formed, and a motor 47 that rotates the spinning disk 46 at an approximately constant speed. The scanning optical-microscope-observation unit controller 64 controls the device 45. Even if a Nipkow disk, in which a plurality of pinholes are formed, is used instead of the spinning disk 46, the similar confocal effect can be obtained.

The light emitted from the halogen lamp source 41 in the optical microscope observation unit 40 is projected onto the spinning disk 46 through an excitation filter 42. Light passing through slits of the spinning disk 46 is reflected by the reflecting mirror 21, passes through the object lens 23, and converges onto a sample 25.

When the sample 25 is irradiated with excitation light, neurons 26 to be observed in the sample 25 emits fluorescence. The fluorescence emitted from the sample 25 is guided in the backward direction along the optical path, and only light that passes through the slits of the spinning disk 46 again passes through a dichroic mirror 43 to form a confocal image on a CCD camera 44. When the spinning disk device 45 is used, confocal image information 92 can be acquired for the thick sample 25.

The charges accumulated in the CCD camera 44 are converted into a digital electric signal in an A/D input CH 71, and are sequentially stored at each block of the confocal image information 92 in a memory 73. The memory 73 stores (1) a plurality of pieces of the confocal image information 92 acquired by moving a focus in the Z direction little by little with the optical microscope observation unit 40, (2) brightness image information 93 created from the plurality of pieces of the confocal image information 92, (3) a scanning map 77 created from the brightness image information 93, and the like.

An image processor 74 constructs a two-dimensional image from the confocal image information 92 stored in the memory 73 through a main controller 61, and displays the image on a monitor 8. Moreover, the unit 74 constructs a three-dimensional image 95 by laminating a plurality of pieces of confocal image information 92 in the Z direction, and displays the image on the monitor 8.

Figure 10:
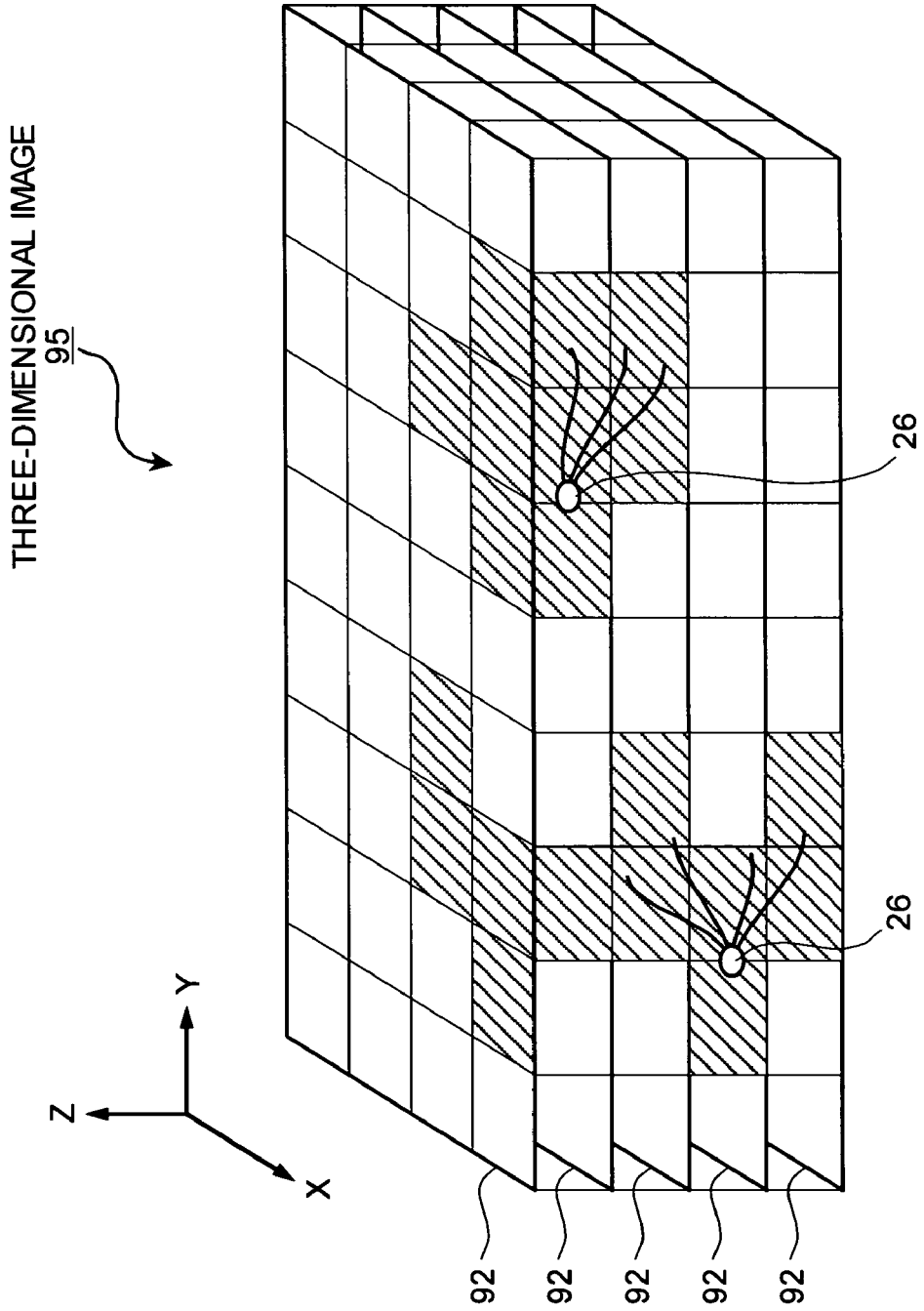
FIG. 10 is a view that depicts a three-dimensional image made by laminating in the Z direction a plurality of pieces of confocal image information.

FIG. 10 is a view of the three-dimensional image 95 made by laminating in the Z direction a plurality of pieces of the confocal image information 92 stored in the memory 73. Though a neuron 26 is recognized as a point in one confocal image 92, relations as a neuron 26 can be recognized in the three-dimensional image 95. Diagonally shaded portions in FIG. 10 are blocks in which a neuron 26 to be observed exists.

A computer 60 includes a brightness-image-information creator 65 in addition to components of the computer 6 in the first embodiment. The brightness-image-information creator 65 creates the brightness image information 93 obtained by collecting, in the X and Y directions, information on all the pixels which have the highest brightness among pixels in the Z direction of the three-dimensional image 95, and a scanning map creator 66 creates a scanning map 77, based on the created brightness image information 93.

Figure 11:
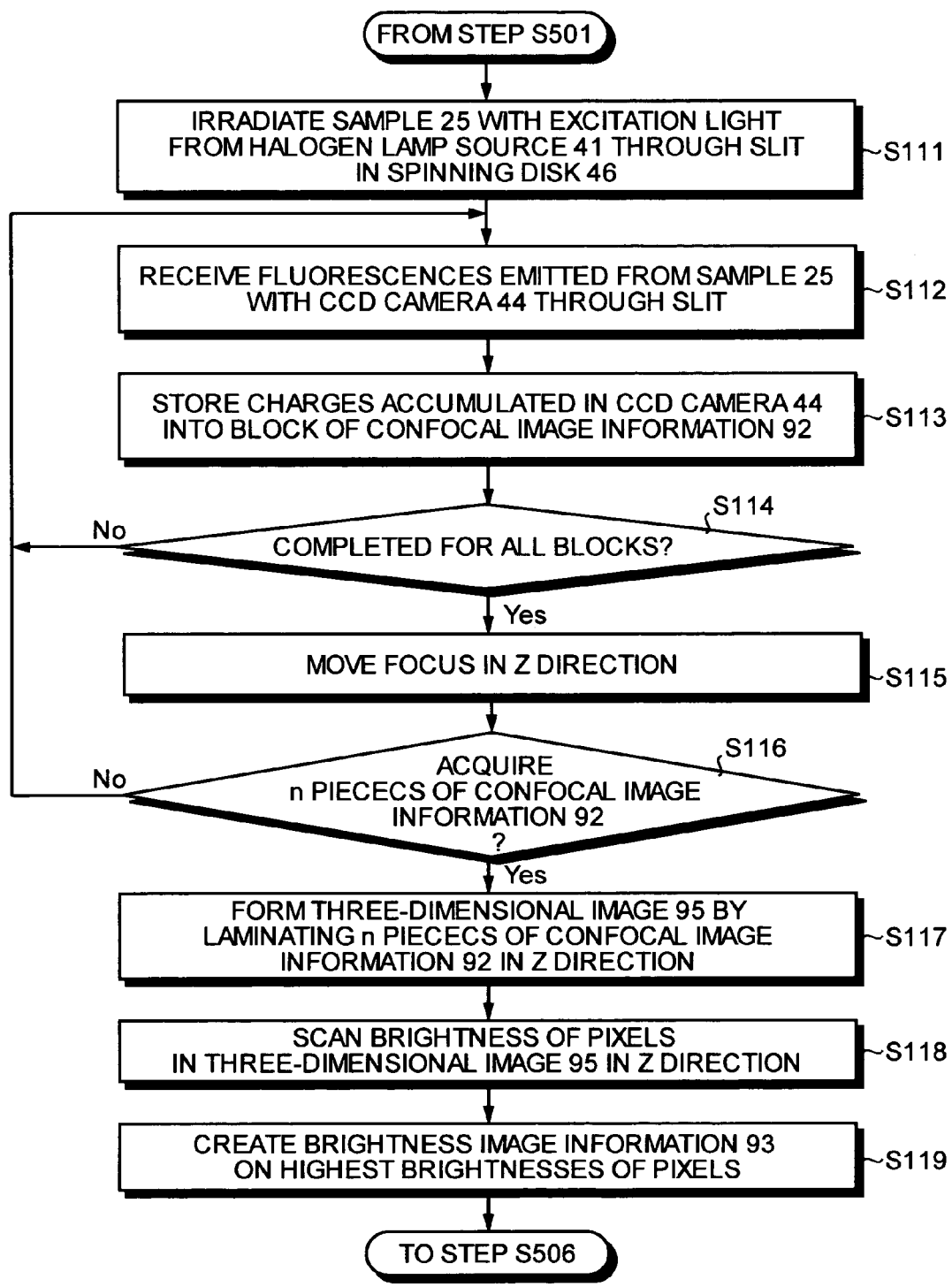
FIG. 11 is a flow chart that depicts processing procedure by which the scanning map is created.

FIG. 11 is a flow chart that depicts processing procedure by which the scanning map 77 is created, and which are inserted between step S501 and step S506 in FIG. 5. In the first place, an optical path in a microscope main body 2 is switched to the optical microscope observation unit 40 at step S501 in the first embodiment. Then, the optical-microscope-observation unit controller 64 extracts the excitation light from white light emitted from the halogen lamp source 41 in the optical microscope observation unit 40 with the excitation filter 42 and the excitation light enters the microscope main body 2 from an optical path switch 3 through the dichroic mirror 43 and the slits of the spinning disk 46 under control of the unit 64.

A microscope-main-body controller 62 controls the excitation light that enters the microscope main body 2 so that the light irradiates the sample 25 mounted on a motor-driven XY stage 24 through the reflecting mirror 21 in the microscope main body 2, and the object lens 23 installed in the revolver 22 (step S111).

When the excitation light irradiates the sample 25, the neurons 26 to be observed in the sample 25 emits fluorescence. The fluorescence emitted from the sample 25 is guided in the backward direction along the optical path, and only light that passes through the slits of the spinning disk 46 again passes through a dichroic mirror 43, and the CCD camera 44 receives the light (step S112).

The charges accumulated in the CCD camera 44 according to the amount of the light are converted into a digital electric signal in the A/D input CH 71, and are stored in one block in the confocal image information 92 (step S113). When the processing is not completed for all blocks (NO at step S114), the processing returns to step S112 to acquire the image of the subsequent block.

When the processing of image acquisition is completed for all blocks (YES at step S114), the focus of the microscope main body 2 is moved in the Z direction of a little (step S115). If n pieces of the confocal image information 92 are not acquired (NO at step S116), the processing returns to step S112 to acquire the subsequent confocal image information 92. On the other hand, if n pieces of the confocal image information 92 are acquired (YES at step S116), a plurality of pieces of the acquired confocal image information 92 are laminated in the Z direction to form the three-dimensional image 95 (step S117).

The brightness-image-information creator 65 searches for the brightness of each pixel in the three-dimensional image 95 in the Z direction (step S118), processing that the highest brightness is assumed to be a brightness of the pixel is repeated for each pixel in the confocal image information 92 to form the brightness image information 93 (step S119), the processing returns to step S506 in the first embodiment, and processing of creating the scanning map 77 is continued.

Figure 12:
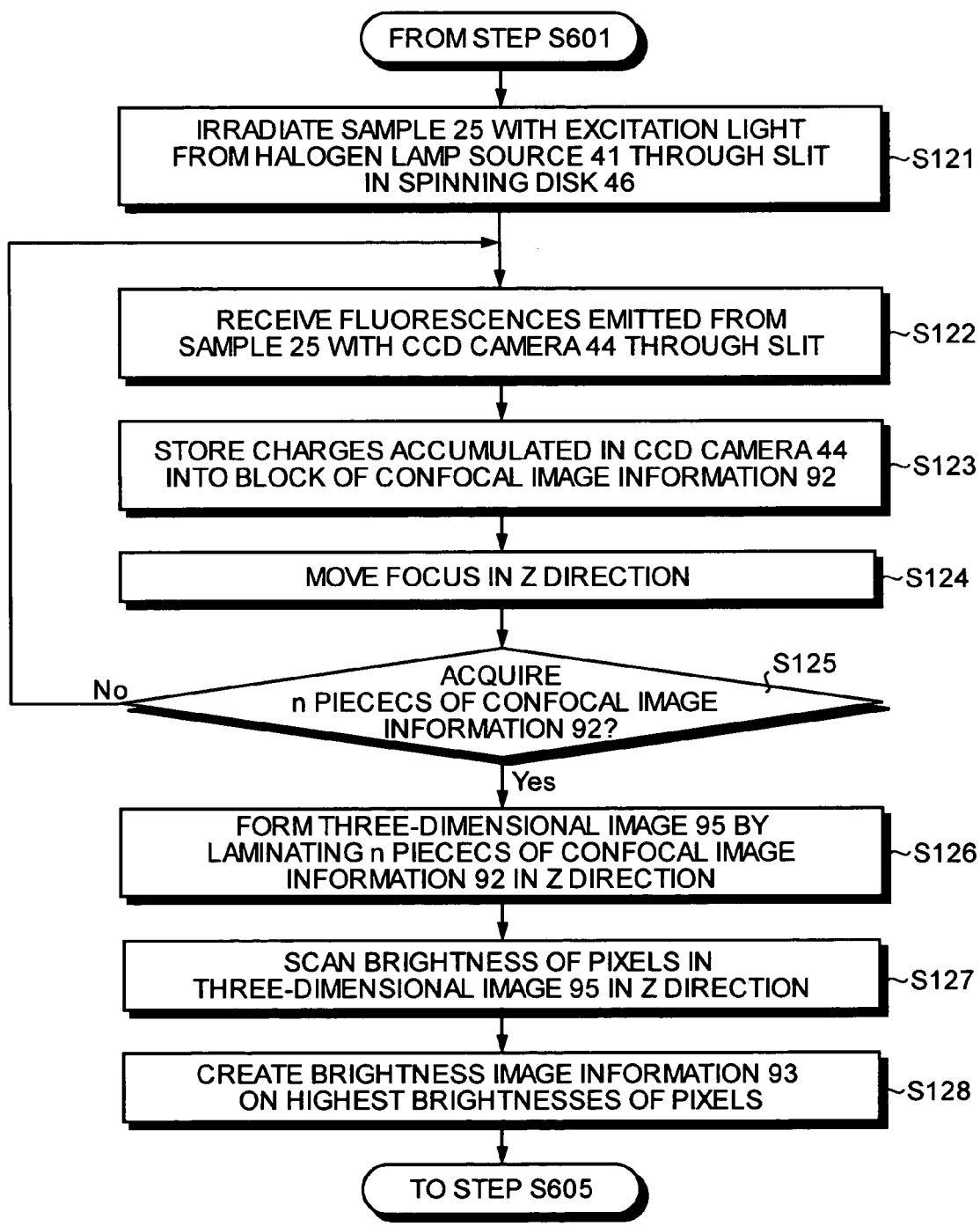
FIG. 12 is a flow chart that depicts another processing procedure by which the scanning map is created.

FIG. 12 is a flow chart that depicts other processing procedure by which the scanning map 77 is created, and which are inserted between step S601 and step S605 in FIG. 6. Processing from step S121 to step S123 is the same as the processing from step S111 to step S113 through which the image of one block in the confocal image information 92 is acquired. Processing from step S124 to step S128 is also the same as the processing from step S115 to step S119 through which blocks in the acquired confocal image information 92 are laminated in the Z direction to obtain the three-dimensional image 95 and the brightness image information 93. In the processing shown in FIG. 12, after acquiring the image of one block in the confocal image information 92, blocks acquiring the image are laminated in the Z direction, to obtain the three-dimensional image 95 for one block and the brightness image information 93 for one block. The scanning map 77 may be created according to processing shown either in FIG. 11, or in FIG. 12.

When processing of creating the scanning map 77 is completed, processing of searching the scanning map 77 can be started in the similar manner to that of the first embodiment to acquire the scanning image information 79 of one block registered in the scanning map 77 with the flying spot scanning observation unit 5.

Though the spinning disk device 45 is used in the second embodiment in order to obtain the confocal image information 92, there can be applied a configuration, instead of using the spinning disk device 45, in which image processing such as deconvolution is performed for the optical image information 76 acquired in the first embodiment to remove portions, which are out of focus, other than the focus included in the optical image information 76. In this case, image processing such as deconvolution can improve accuracy in screening of the neurons 26.

As explained above in detail, according to the second embodiment, an optical tomogram of the sample 25 can be acquired without performing the image processing such as deconvolution to obtain sharp scanning image information 79 on a plane corresponding to the focus position, because the spinning disk device 45 is arranged in the CCD camera 44 in addition to the effect of the first embodiment. The three-dimensional image 95 of the sample 25 can be obtained by laminating the confocal image information 92 in the Z direction. Moreover, since the brightness image information 93 is created by collecting, in the X and Y directions, information on all the pixels that have the highest brightness among pixels in the Z direction of the three-dimensional image 95, and the scanning map 77 is created, based on the brightness image information 93, screening with high accuracy can be realized without overlooking neurons 26 with possibility that it is easy to miss the cells due to the thickness of the sample 25 in the Z direction.

A third embodiment is a combination of the first embodiment and the second embodiment, and has a configuration in which a plurality of pieces of confocal image information 92 acquired by moving a focus in the Z direction little by little with a optical microscope observation unit 40 are screened respectively to form a three-dimensional scanning map, and a region to be observed with the flying spot scanning observation unit 5 is specified as a three-dimensional region.

Figure 13:
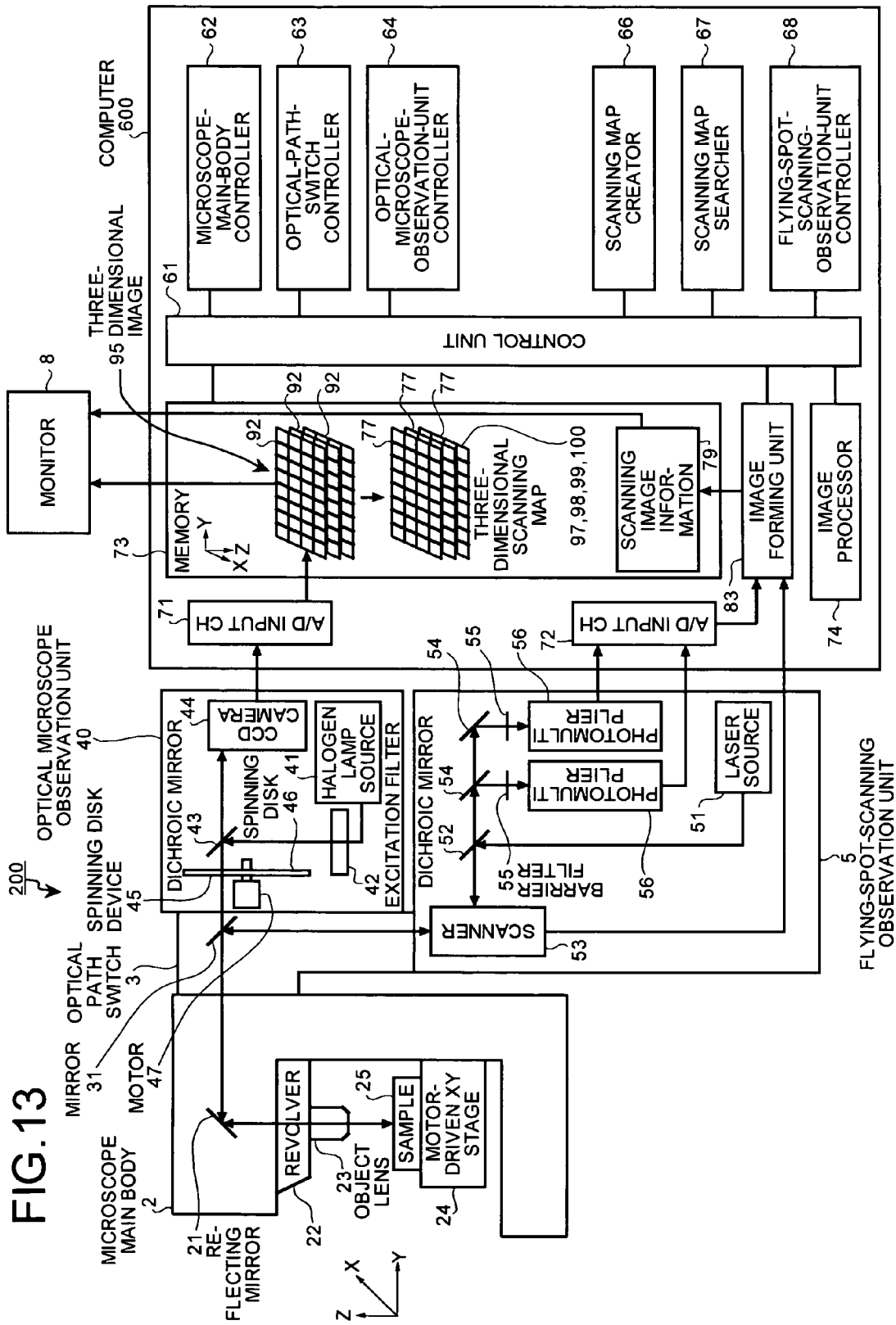
FIG. 13 is a block diagram that depicts a configuration of a scanning microscope system according to a third embodiment of the present invention.

FIG. 13 is a block diagram that depicts a configuration of a scanning microscope system 200 according to the present invention. In the scanning microscope system 200 shown in FIG. 13, components similar to those in the scanning microscope system 1 according to the first embodiment shown in FIG. 1, and in the scanning microscope system 100 according to the second embodiment shown in FIG. 9 are denoted by the same reference numbers as those in FIG. 1 and FIG. 9.

An optical microscope observation unit 40 has a configuration in which a spinning disk device 45 is arranged at a confocal position on an optical path to acquire a confocal image. An optical-microscope-observation unit controller 64 acquires a plurality of the confocal image information 92 obtained by moving a focus little by little in the Z direction with a optical microscope observation unit 40. A scanning map creator 66 creates a scanning map 77 for each of the acquired confocal image information 92 according to the flow chart in FIG. 5 or FIG. 6, and laminates the above scanning maps 77 in the Z direction to form a three-dimensional scanning map 97.

Figure 14A:
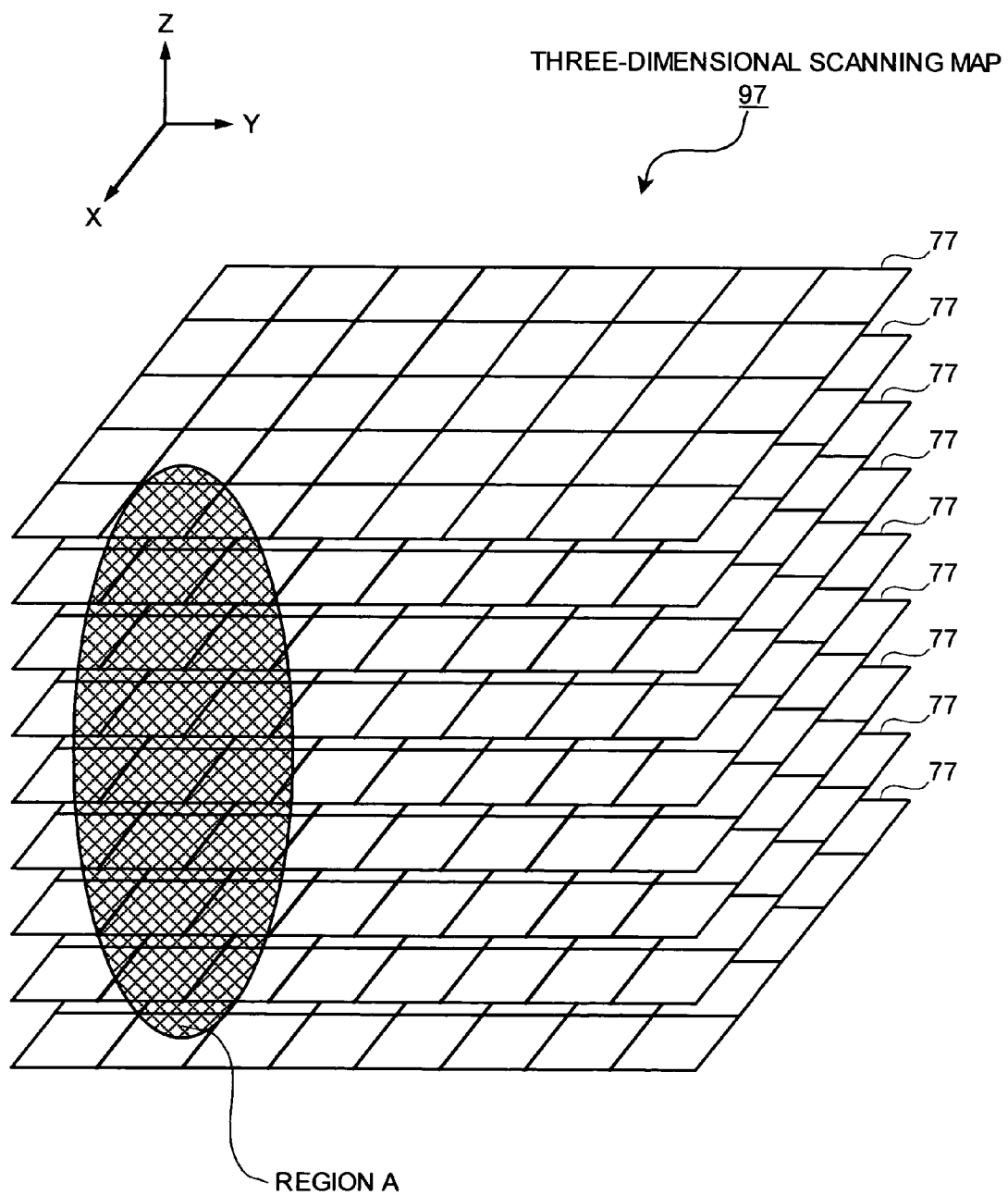
FIG. 14A is a view that depicts an example of the three-dimensional scanning map.

FIG. 14A is a view that depicts an example of the three-dimensional scanning map 97, in which a region A represents positions of blocks registered as blocks, which acquires images with the flying spot scanning observation unit 5, according to the processing at step S508 or step S607 in the scanning map creator 66. Accordingly, a region to be observed with the flying spot scanning observation unit 5 can be specified as a three-dimensional region, using the three-dimensional scanning map 97.

Then, processing that acquires scanning image information 79 excited by each fluorescence when a sample is multiple-stained is explained in the third embodiment. When the sample 25 is multiple-stained, an excitation filter 43 in the optical microscope observation unit 40 is changed according to the fluorescence with which the sample 25 is stained, and the wavelength of the excitation light with which the sample 25 is irradiated is switched to respectively acquire a confocal image 92. The scanning map 77 is created for each piece of acquired confocal image information 92 to laminate it in the Z direction. Thereby, a three-dimensional scanning map 97 like one as shown in FIG. 14A is created for each fluorescence with which the sample 25 is stained.

For example, when the sample 25 is stained with triple fluorescence excited by three wavelengths of 351 nm, 488 nm, and 543 nm, the wavelength of the excitation filter 43 in the optical microscope observation unit 40 is switched to 351 nm in the first place for irradiation of the excitation light, and, for example, the three-dimensional scanning map 97 shown in FIG. 14A is created. The region A is an region excited by light with a wavelength of 351 nm. A cell in the region A emits fluorescence when excited by light with a wavelength of 351 nm.

Figure 14B:
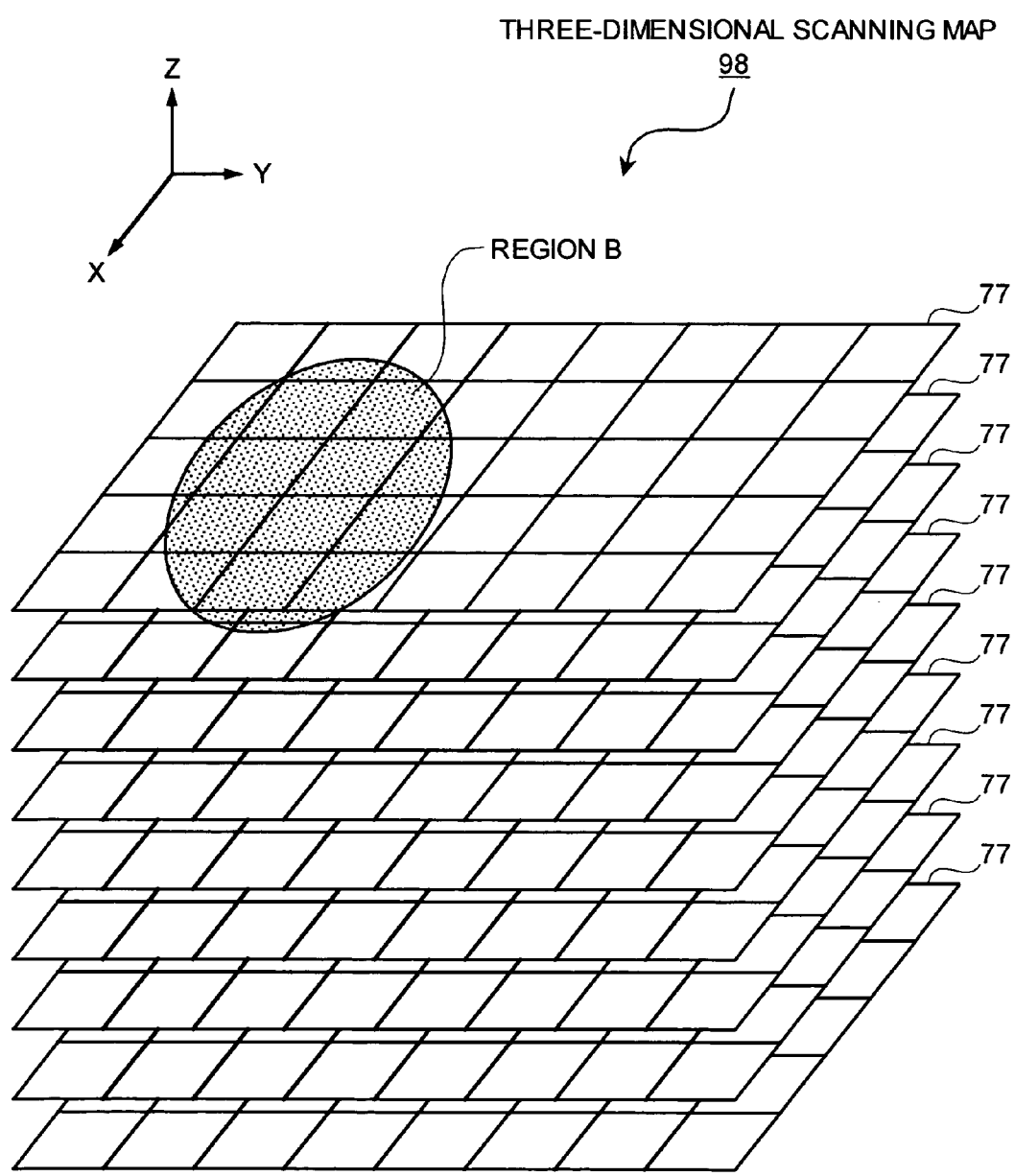
FIG. 14B is a view that depicts one example of a three-dimensional scanning map.
Figure 14C:
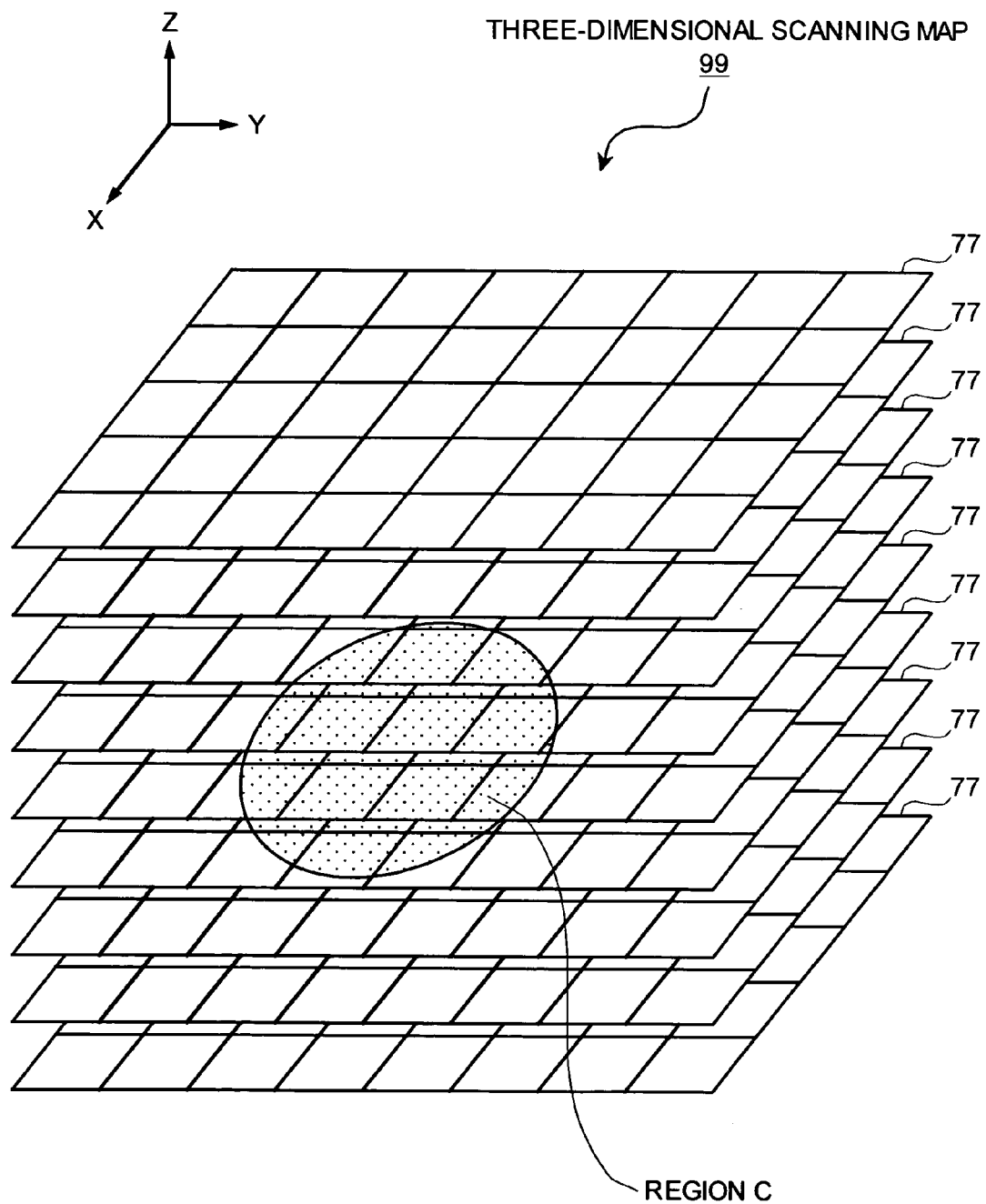
FIG. 14C is a view that depicts one example of a three-dimensional scanning map.

Similarly, when the excitation filter 43 in the optical microscope observation unit 40 is changed to cause the excitation light of 488 nm for irradiation, a three-dimensional scanning map 98 in FIG. 14B is created, the excitation filter 43 is changed to cause the excitation light of 543 nm for irradiation, and a three-dimensional scanning map 99 in FIG. 14C is created, it is found that a cell in a region B emits fluorescence when excited by light with a wavelength of 488 nm, and a cell in a region C emits fluorescence when excited by light with a wavelength of 543 nm.

Figure 14D:
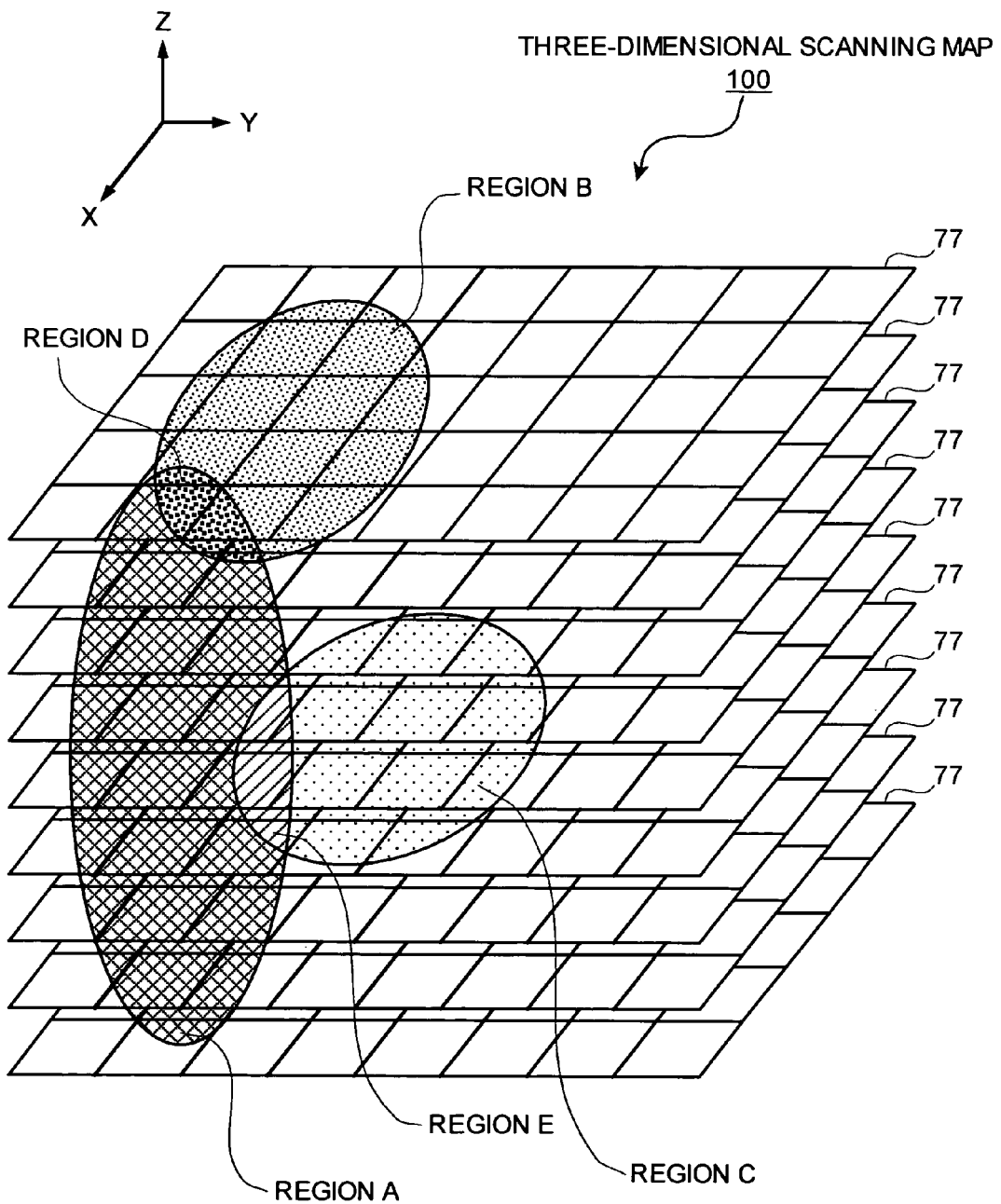
FIG. 14D is a view that depicts one example of a three-dimensional scanning map.

Then, the three-dimensional scanning map 97, the three-dimensional scanning map 98, and, the three-dimensional scanning map 99 are superimposed to create a three-dimensional scanning map 100 shown in FIG. 14D. According to the three-dimensional scanning map 100, it is found that two kinds of cells, one reacting to excitation light with a wavelength of 351 nm and the other reacting to excitation light with a wavelength of 488 nm, exist in a region D in which the region A and the region B overlap one another, two kinds of cells, one reacting to excitation light with a wavelength of 351 nm and the other reacting to excitation light with a wavelength of 543 nm, exist in a region E in which the region A and the region C overlap one another, and only one kind of a cell exists in a region in which there are no overlapped regions.

An image processor 74 performs image processing in such a way that the region A of the three-dimensional scanning map 97 is displayed blue, the region B of the three-dimensional scanning map 98 is displayed green, the region C of the three-dimensional scanning map 99 is displayed red. The three-dimensional scanning map 97, the three-dimensional scanning map 98, the three-dimensional scanning map 99, which undergo the above image processing, and the three-dimensional scanning map 100 overlapping the above three maps are displayed on the monitor 8. When the three-dimensional scanning map 100 and the like are displayed on the monitor 8, the observer can visually understand that two kinds of cells, one reacting to excitation light with a wavelength of 351 nm and the other reacting to excitation light with a wavelength of 488 nm, exist in a region D in which the region A and the region B overlap one another, two kinds of cells, one reacting to excitation light with a wavelength of 351 nm and the other reacting to excitation light with a wavelength of 543 nm, exist in a region E in which the region A and the region C overlap one another, and only one kind of a cell exists in a region in which there are no overlapped regions.

According to the three-dimensional scanning map 100, information on the kind of the laser beam source 51 and the laser wavelength, in addition to the X, Y, and Z positions information of a block to be irradiated with laser beam, can be obtained for each block. Though image acquisition conditions is obtained from the three-dimensional scanning map 100, the image acquisition conditions, by which the scanning image information 79 is acquired, are memorized in the memory 73 in the computer 600 as an image acquisition condition table 110.

Figure 15:
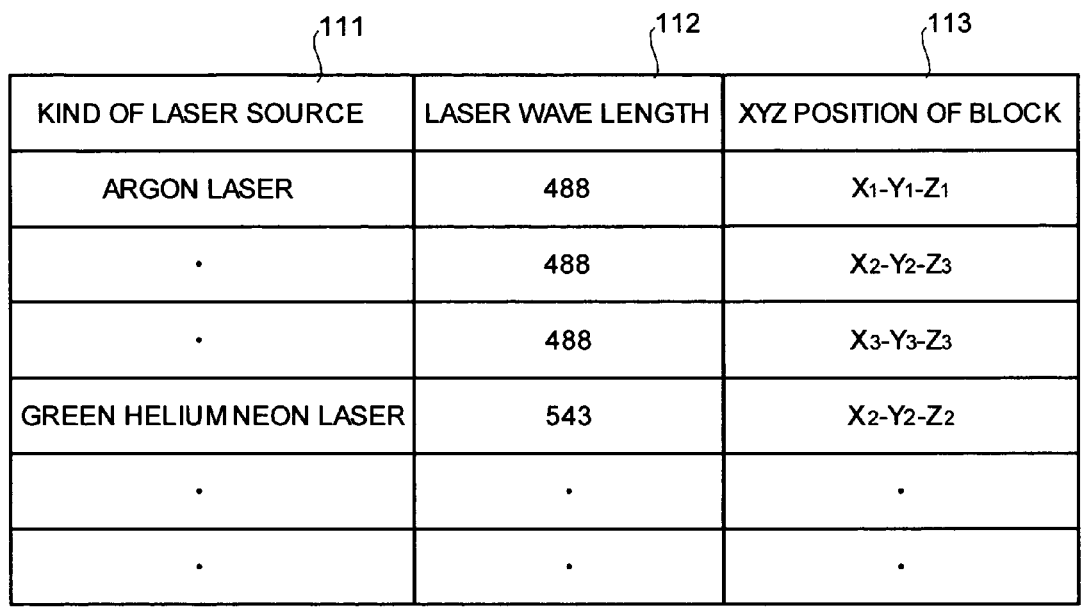
FIG. 15 is a view that depicts one example of an image acquisition condition table.

FIG. 15 is a view that depicts one example of the image acquisition condition table 110. The image acquisition condition table 110 memorizes kinds 111 of laser beam sources; laser wavelengths 112, and image acquisition conditions such as X, Y, and Z positions 113 of blocks. A flying-spot-scanning-observation unit controller 68 automatically selects the kind 111 of the laser beam source, and the laser wavelength 112 according to the image acquisition conditions memorized in the image acquisition condition table 110 to automatically acquire the scanning image information 79 at the X, Y, and Z positions 113 of the memorized block.

As described in the third embodiment, the X, Y, and Z positions of the registered block can be accurately obtained. However, when registered blocks in the sample 25 are repeatedly observed for a long time while controlling a motor-driven focus adjusting unit such as the motor-driven XY stage 24, heat by a halogen lamp source 41 or a laser beam source 51, and the like causes rise in the temperature around the microscope to generate a possibility that deflection in the microscope main body 2 is caused. Moreover, repeated moving of the motor-driven XY stage 24 causes position displacement, and a possibility that the X, Y, and Z positions of the blocks registered as a region to be observed are displaced.

In such case, on a regular basis, or, before observation with the flying spot scanning observation unit 5, the microscope main body 2 is connected to the optical microscope observation unit 40, and the position displacement in the Z direction is corrected after auto focusing with use of image data in the CCD camera 44. Moreover, when position displacement in pixels is found to be generated in comparison between the image acquired by the previous auto focusing and that by the current auto focusing, the amount of the displacement is automatically calculated to correct the position displacement of the X and Y positions. When the flying spot scanning observation unit 5 is connected to the microscope main body 2 after completion of the correction of the X, Y, and Z positions, the image information can be always acquired at the same position. Moreover, position displacement in the Z direction may be corrected by providing a well-known passive, or active auto focus (AF) unit in the optical microscope observation unit 4.

As explained above in detail, according to the third embodiment, useless image acquisition time such as time, which is required to search for cells in conformity to the purpose of observation in each block, can be reduced, in addition to the effects of the embodiments 1 and 2. Moreover, as registered blocks is not irradiated with unnecessary laser beam even when a sample 25 is multiple-stained, fading in fluorescence can be prevented. Further, as registered blocks is irradiated with required laser beam, the scanning image information 79 is less disturbed by noise caused by cross talk between beams of laser beam. Furthermore, as observes is not required to set the laser beam source 51 as one of the image acquisition conditions for each block, the load of observers can be reduced.

A scanning microscope system according to the present invention has an advantage that the system can quickly acquire a sharp scan image with a scanning microscope, because only a selection region is observed by fluorescence microscopy, using excitation light from a laser beam source in a flying spot scanning observation unit, after a sample is screened, using excitation light output from a white light source at an optical microscope observation unit to select the region in which there is a substance to be observed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A scanning microscope system comprising:
    an optical microscope observation unit that irradiates a sample with excitation light, and forms an optical image from fluorescence emitted from the sample;
    a scanning map creator that creates a scanning map indicating a scanning region in which a substance to be scanned exists in the sample, based on a brightness of pixels of the optical image formed by the optical microscope observation unit; and
    a flying spot scanning observation unit that scans only the scanning region of the sample with a laser beam, and forms a scanning image based on fluorescence emitted from the sample, wherein the scanning region is determined based on the scanning map created by the scanning map creator.

2. The scanning microscope system according to claim 1, wherein the scanning region has a size of an image acquired by at least one of the optical microscope observation unit and the flying spot scanning observation unit.

3. The scanning microscope system according to claim 1, wherein the optical microscope observation unit includes a white light source emitting the excitation light.

4. The scanning microscope system according to claim 3, wherein the white light source is a halogen lamp.

5. The scanning microscope system according to claim 3, wherein the white light source is a xenon lamp.

6. The scanning microscope system according to claim 1, wherein the optical microscope observation unit irradiates the sample with a plurality of beams of excitation light, and acquires the optical image corresponding to each beam from fluorescence emitted from the sample, and
    the scanning map creator creates link information between the scanning region in which the substance to be scanned exists and at least one beam of the excitation light.

7. The scanning microscope system according to claim 6, wherein the plurality of beams of excitation light each have a different wavelength.

8. A scanning microscope system comprising:
    an optical microscope observation unit that irradiates a sample with excitation light, and forms an optical image from fluorescence emitted from the sample;
    a scanning map creator that creates a scanning map indicating a scanning region in which a substance to be scanned exists in the sample, based on a brightness of pixels of the optical image formed by the optical microscope observation unit; and
    a flying spot scanning observation unit that scans the scanning region of the sample with a laser beam, and forms a scanning image based on fluorescence emitted from the sample, wherein the scanning region has a number of pixels with brightness higher than a threshold, the number being larger than a predetermined number.

9. A scanning microscope system comprising:
    an optical microscope observation unit that irradiates a sample with excitation light, and forms an optical image from fluorescence emitted from the sample;
    a scanning map creator that creates a scanning map indicating a scanning region in which a substance to be scanned exists in the sample, based on a brightness of pixels of the optical image formed by the optical microscope observation unit; and
    a flying spot scanning observation unit that scans the scanning region of the sample with a laser beam, and forms a scanning image based on fluorescence emitted from the sample;
    wherein the optical microscope observation unit includes a spinning disk inserted into a confocal position on an optical path for observation of the sample, and acquires the optical image by a confocal method, and wherein the spinning disk includes an optical transmission portion.

10. The scanning microscope system according to claim 9, wherein the optical transmission portion includes a plurality of pinholes.

11. The scanning microscope system according to claim 9, wherein the optical transmission portion includes a plurality of slits.

12. The scanning microscope system according to claim 9, wherein the optical image is a three-dimensional image formed by laminating a plurality of confocal images formed by moving a focus point in a depth direction of the sample.

13. The scanning microscope system according to claim 12, wherein the scanning region is determined based on a brightness of pixels of the three-dimensional image.

14. The scanning microscope system according to claim 13, wherein the optical image is a two-dimensional brightness image including pixels with a highest brightness among pixel groups in the confocal images.

* * * * *